US011222382B2

(12) United States Patent
Belke

(10) Patent No.: US 11,222,382 B2
(45) Date of Patent: Jan. 11, 2022

(54) SYSTEM AND METHOD FOR ACCELERATING DELIVERY OF GOODS AND SERVICES

(71) Applicant: EATELLI INC., Carlsbad, CA (US)

(72) Inventor: Marcus Belke, Carlsbad, CA (US)

(73) Assignee: Eatelli Inc., Carlsbad, CA (US)

( * ) Notice: Subject to any disclaimer, the term of this patent is extended or adjusted under 35 U.S.C. 154(b) by 135 days.

(21) Appl. No.: 16/479,092

(22) PCT Filed: Feb. 22, 2018

(86) PCT No.: PCT/US2018/019091
§ 371 (c)(1),
(2) Date: Jul. 18, 2019

(87) PCT Pub. No.: WO2018/156677
PCT Pub. Date: Aug. 30, 2018

(65) Prior Publication Data
US 2019/0378202 A1 Dec. 12, 2019

Related U.S. Application Data

(60) Provisional application No. 62/462,144, filed on Feb. 22, 2017.

(51) Int. Cl.
*G06Q 30/06* (2012.01)
*G06Q 10/08* (2012.01)
(Continued)

(52) U.S. Cl.
CPC ..... *G06Q 30/0641* (2013.01); *G06F 16/9554* (2019.01); *G06Q 10/0832* (2013.01); *G06Q 30/0637* (2013.01); *G06Q 50/12* (2013.01)

(58) Field of Classification Search
CPC .......... G06Q 30/0641; G06Q 30/0637; G06Q 10/0832; G06Q 50/12
(Continued)

(56) References Cited

U.S. PATENT DOCUMENTS

| 6,688,435 | B1 * | 2/2004 | Will | G06Q 20/12 |
| | | | | 186/35 |
| 2005/0246240 | A1 * | 11/2005 | Padilla | G06Q 10/06 |
| | | | | 705/26.3 |

(Continued)

*Primary Examiner* — Florian M Zeender
*Assistant Examiner* — Christopher R Buchanan
(74) *Attorney, Agent, or Firm* — Jonathan Kidney; Intelink Law Group, P.C.

(57) ABSTRACT

A system and method for providing location and time-based scheduling of preparation and delivery of goods and/or services. Customer's app on a personal device and service-side software, with a transaction server (Eatelli) provide ordering, geo-location, estimated arrival, delivery of order goods with little to no interaction with service personnel. Automatic location and check-in is facilitated via geo-location or scanning of location-sensors/markers. Service attendants can provide delivery of goods without engaging the customer and be directed to the location of the customer at the servicing institution. Management of ordering, billing, re-ordering, up-keep of the customer can be adjudicated via the software and location markers. The system and method avoids queuing delays typically found in restaurants and take-out/pick-up orders.

18 Claims, 19 Drawing Sheets

(51) Int. Cl.
*G06Q 50/12* (2012.01)
*G06F 16/955* (2019.01)

(58) Field of Classification Search
USPC .................................. 705/15, 26.1, 7.12
See application file for complete search history.

(56) References Cited

U.S. PATENT DOCUMENTS

| | | | |
|---|---|---|---|
| 2007/0052586 A1* | 3/2007 | Horstemeyer | G08G 1/20 342/457 |
| 2011/0145101 A1* | 6/2011 | Berger | G06Q 30/0631 705/27.1 |
| 2015/0262121 A1* | 9/2015 | Riel-Dalpe | G06Q 50/12 705/15 |
| 2017/0024789 A1* | 1/2017 | Frehn | G06Q 30/0621 |
| 2017/0178070 A1* | 6/2017 | Wang | G06Q 10/04 |

\* cited by examiner

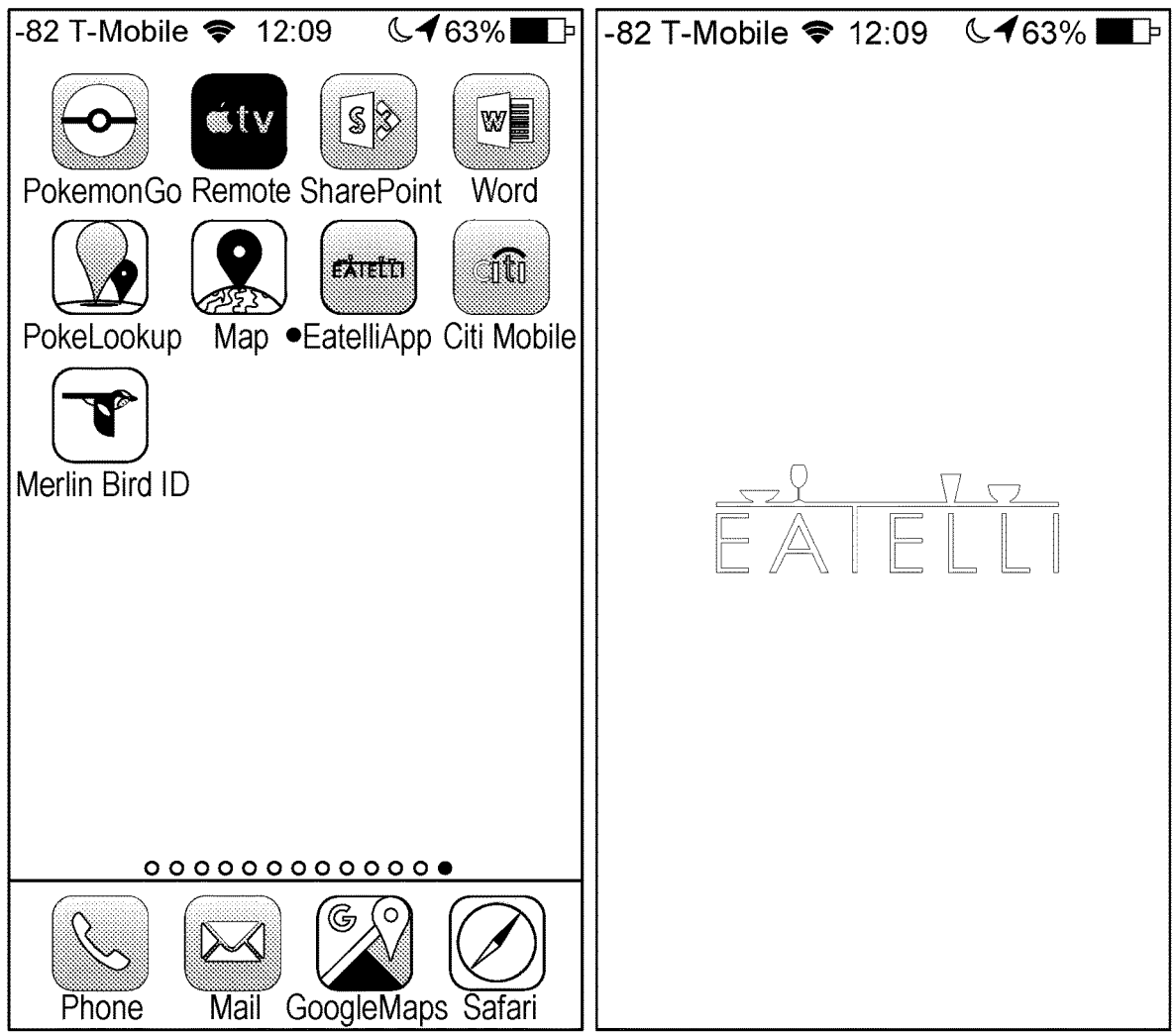
*FIG. 5A*  *FIG. 5B*

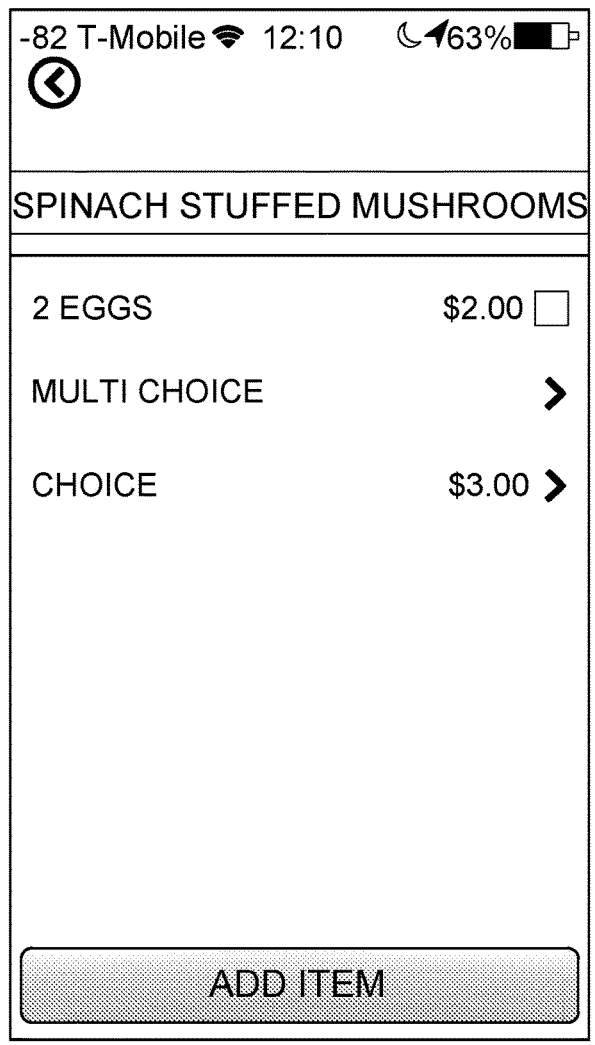
*FIG. 6A*  *FIG. 6B*

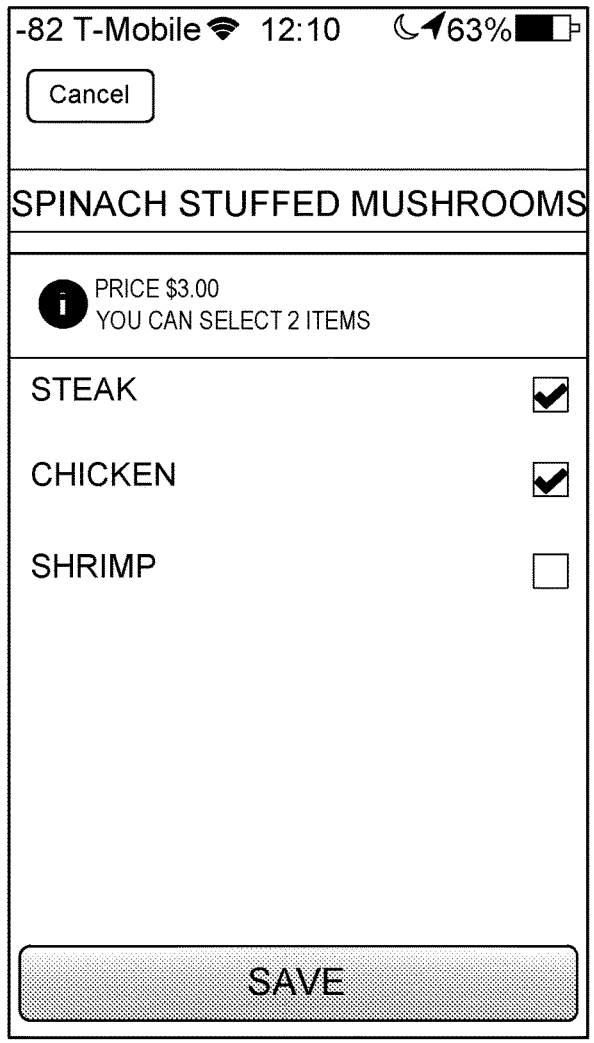 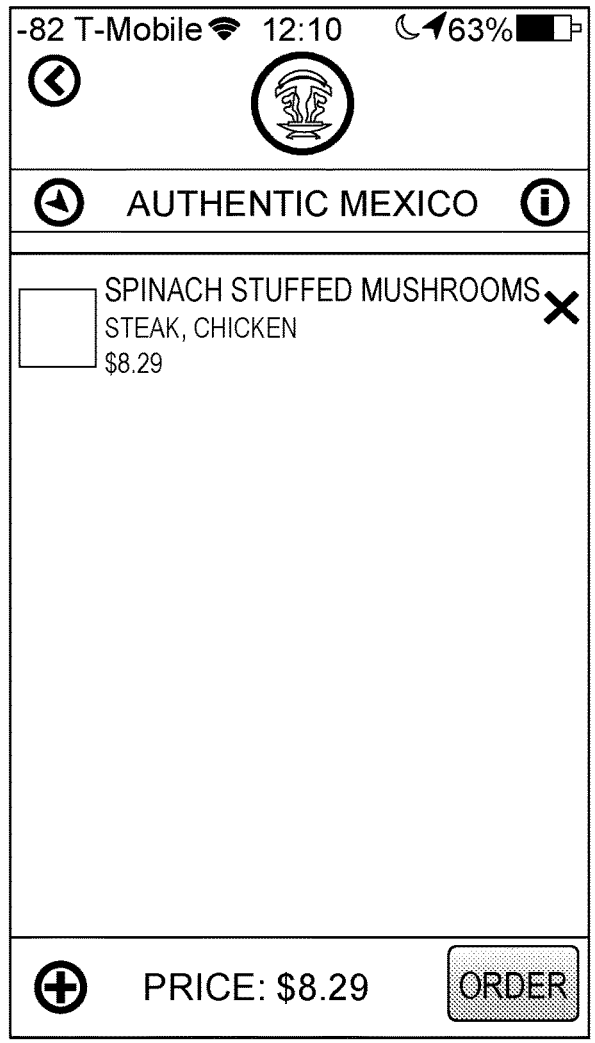
*FIG. 6C*  *FIG. 6D*

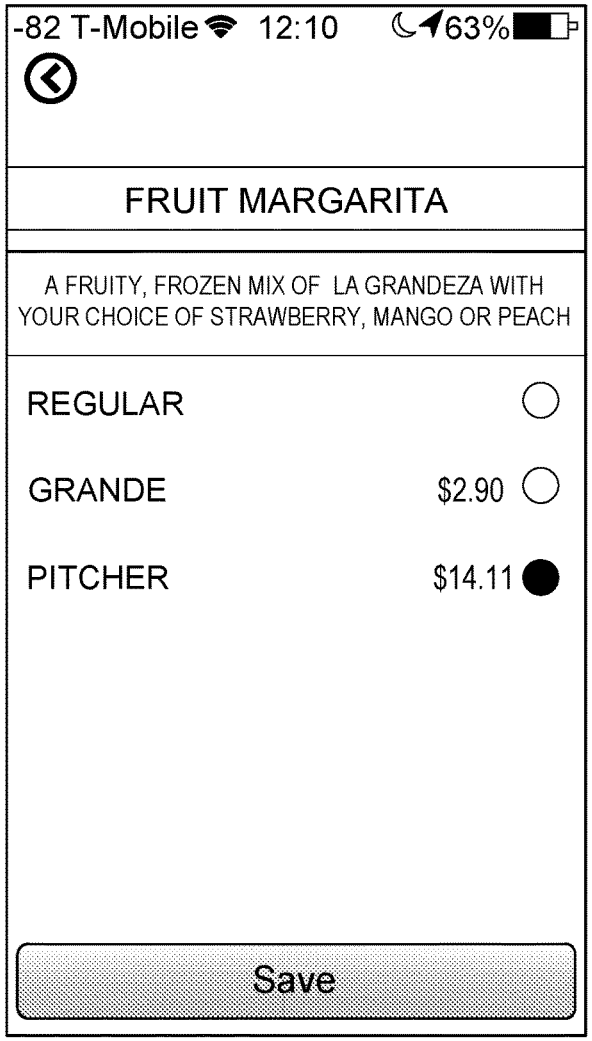 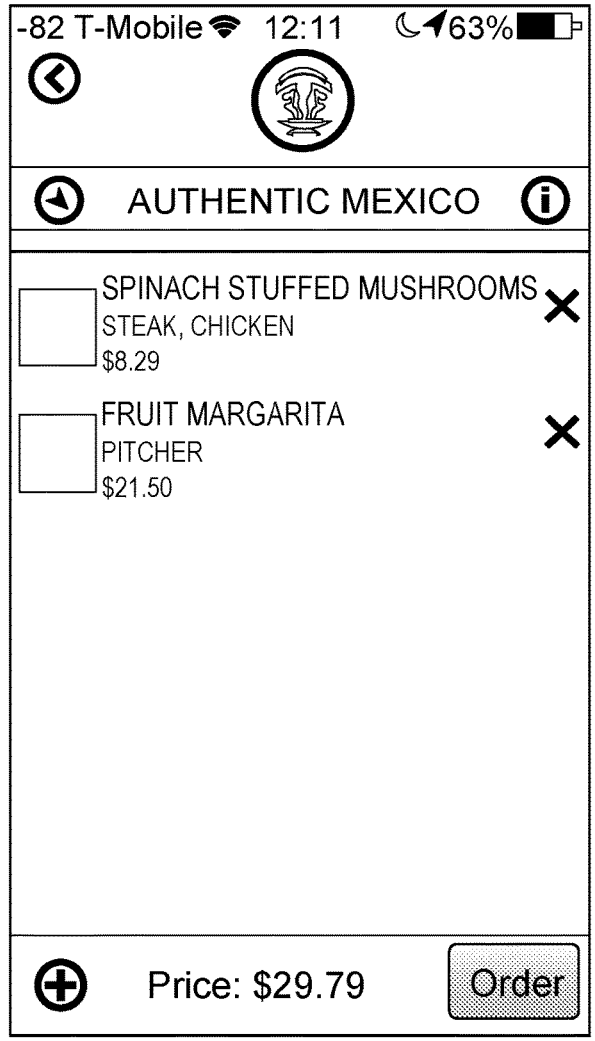
*FIG. 7A*    *FIG. 7B*

 
*FIG. 7C*  *FIG. 7D*

 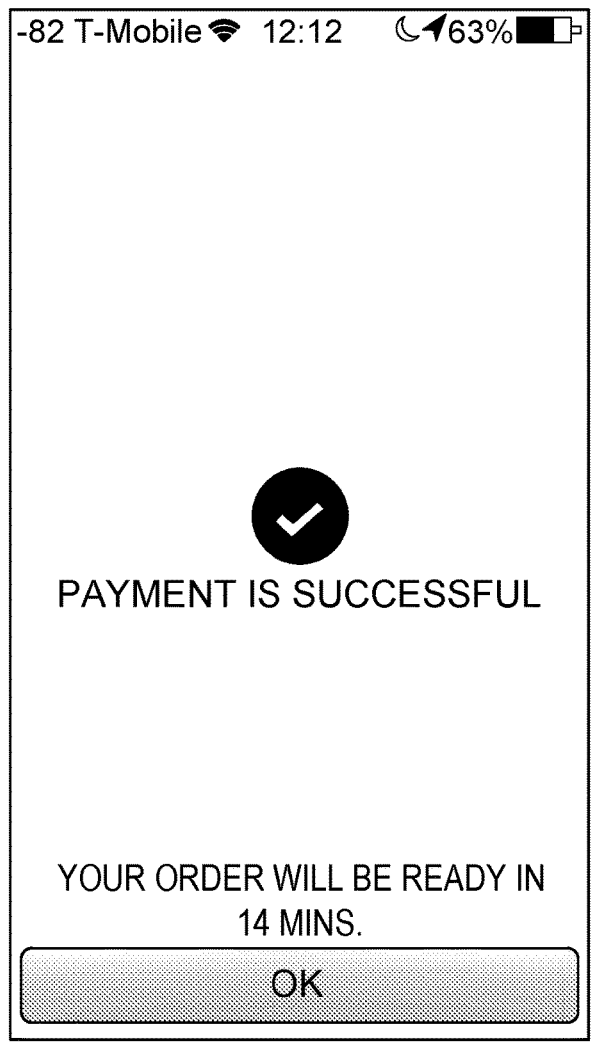
*FIG. 7E*  *FIG. 7F*

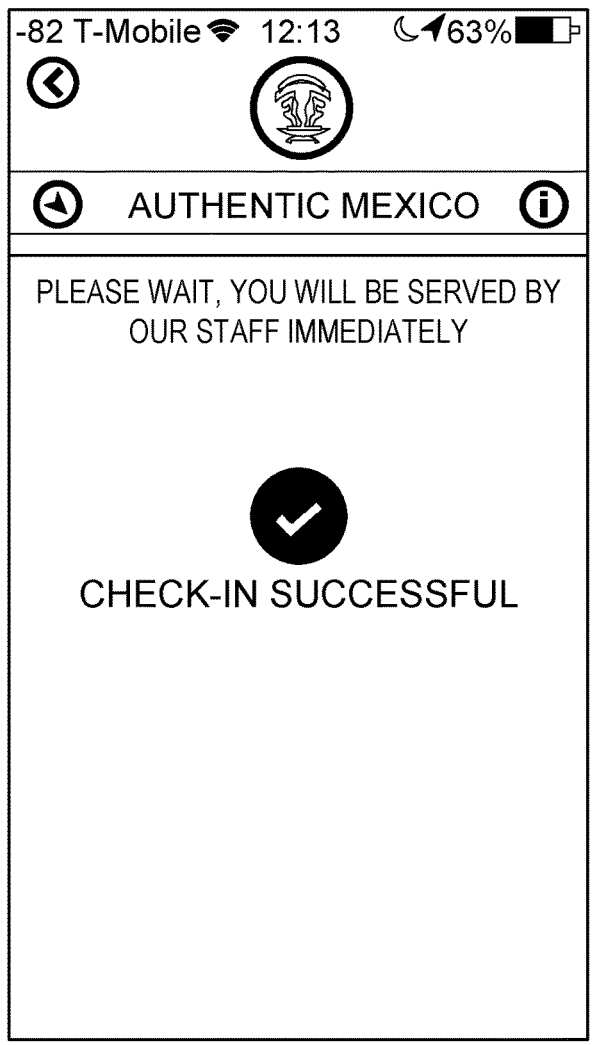
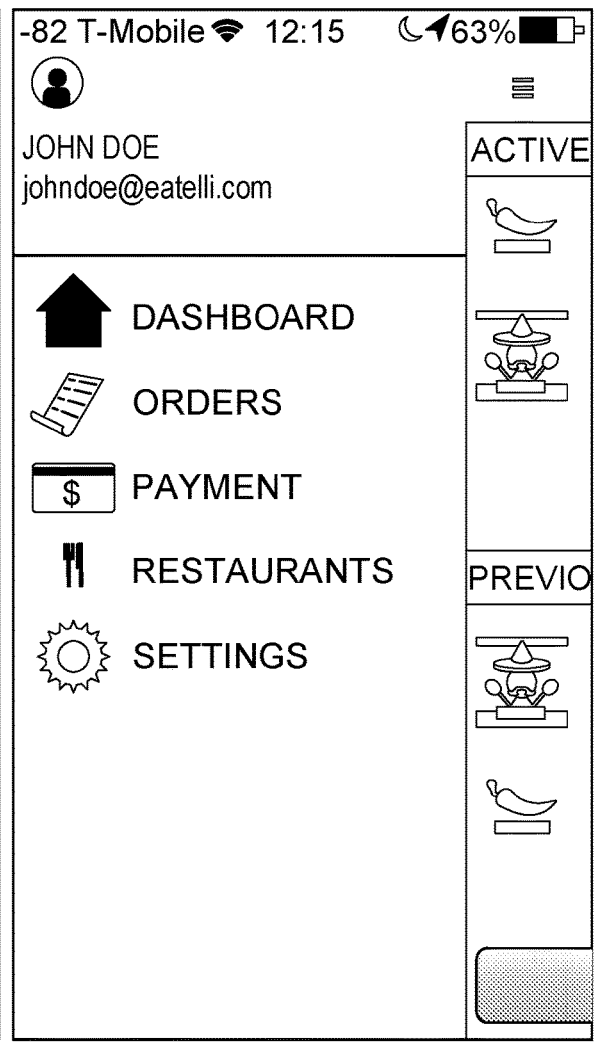
*FIG. 8C*  *FIG. 8D*

SYSTEM AND METHOD FOR ACCELERATING DELIVERY OF GOODS AND SERVICES

CROSS-REFERENCE TO RELATED APPLICATION(S)

This application claims the benefit of U.S. Provisional Patent Application No. 62/462,144, filed Feb. 22, 2017, the contents of which are hereby incorporated by reference in its entirety.

FIELD

This invention is directed to providing rapid/timely delivery of goods/services to an on-site customer. More particularly, it is directed to various systems and methods, utilizing a software controlled, personal hand-held computing device or smartphone, to bypass waiting queues for manual front or rear-end service, and for timely delivery to on-site customers.

BACKGROUND

Other "ordering and delivery" systems are in the prior art, however, they are ineffective when dealing with time-sensitive goods, for example, they do not recognize "when" a customer enters the restaurant or bar to hand over the food or bring the food on time to the table. Therefore, a customer has to still check in with the restaurant or pick-up counter to let the restaurant know s/he has arrived and where s/he will be seated or wait. If the order is processed at the time the order comes in, food and beverages are often already cold or spoiled. Also, the payment process has to be done in the restaurant. Importantly, other systems do not combine the customer's order with the detection of the physical arrival and location of the customer in the restaurant or bar, therefore the food or drink is not fresh (warm, etc.) by the time of arrival. For a typical call-in order, the call-in customer is either informed of when the food/product will be ready (and must gauge his/her travel time to coincide), or the customer ahead-of-time informs when he/she will be arriving and the restaurant must try to gauge their completion of the order to coincide with customer's arrival. Typically, in either scenario, the customer is, more often than not, greeted with cold food or food not yet ready for pickup.

Accordingly there has been a long-standing need in the goods and services industry for various systems and methods to minimize delivery/receipt of time-sensitive goods as well as minimize waiting times, expediting service, attention to customers at a site, automated billing and so forth. Various approaches to these and other problems are presented below.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later. In one aspect of the disclosed embodiments, a method for providing location and time-based scheduling of preparation and delivery of goods and/or services is provided, comprising: ordering, by a customer, a good or service via a customer-side software application resident on a customer's portable smart device, the customer-side software application communicating the order information and customer's current location information to a transaction server, wherein customer's current location information is determined from a geo-location capability of the customer's portable smart device or from a fixed-location code accessed by the customer's device, the fixed-location code being situated at a pre-determined location at a provider's site by the provider of the good or service; receiving through a telecommunications link the customer's order and current customer location information on the transaction server; forwarding through the telecommunications link the customer's order and customer account information to a provider-side software application on a computer of the provider of the good or service, wherein at least one of the provider-side software application and transaction server automatically determines an estimated time of arrival of the customer at the provider's site or, if the customer is at the provider's site, the customer's on-site location; processing the customer's order, by the provider of the good or service, via at least the provider-side software application and transaction server; determining a scheduling time for beginning preparation of the ordered good or service by the provider by comparing a preparation completion time and at least one of the estimated time of arrival of the customer and the customer's current location information; and acknowledging the customer's order, by the provider of the good or service, via at least the provider-side software application and transaction server by sending a confirmation to the customer-side software; and wherein the method reduces a wait time for a receipt of the ordered good or service.

In another aspect of the disclosed embodiments, the above method is provided, wherein the fixed-location code is at least one of a barcode, RFID, QR code, photograph, picture, and unique sound; and/or wherein the customer account information includes at least one of banking, credit card, and billing information; and/or wherein the estimated time of arrival of the customer at the provider's site is based on traffic information; and/or wherein provider-side software application communicates the customer's order and current customer location information to a personal provider device in possession by service personnel at the provider's site; and/or wherein the customer's current location information is updated periodically to provide a most current location information; and/or wherein the customer-side software application is loaded as a downloadable app; and/or wherein billing information is electronically processed by the either the provider-side software application or transaction server; and/or wherein an order receipt is printed out by the provider-side software to a printer at the provider's site; and/or further comprising a plurality of customers; and/or further comprising a plurality of fixed-location codes; and/or wherein the customer order is a reservation; and/or wherein the order is an order for at least one of food and drink; and/or further comprising, sending from the customer-side software a request for "do not disturb" to the provider-side software application; and/or further comprising sending from the customer-side software an invite request to other customers' portable smart devices.

In yet another aspect of the disclosed embodiments, a machine-readable storage medium having stored thereon a computer program for location and time-based scheduling of preparation and delivery of goods and/or services is provided, comprising instructions for processing an order by a customer via a customer-side software application resident on a customer's portable smart device, the customer-side software application communicating the order information and customer's current location information to a transaction server, wherein customer's current location information is determined from a geo-location capability of the customer's portable smart device or from a fixed-location code accessed by the customer's device, the fixed-location code being situated at a pre-determined location at the provider's site by the provider of the good or service; instructions for sending through a telecommunications link the customer's order and current customer location information to the transaction server; instructions for forwarding through the telecommunications link the customer's order and customer account information to a provider-side software application on a computer of the provider of the good or service, wherein at least one of the provider-side software application and transaction server automatically determines an estimated time of arrival of the customer at the provider's site or, if the customer is at the provider's site, the customer's on-site location; instructions for processing the customer's order, by the provider of the good or service, via at least the provider-side software application and transaction server; instructions for determining a scheduling time for beginning preparation of the ordered good or service by the provider by comparing a preparation completion time and at least one of the estimated time of arrival of the customer and the customer's current location information; and instructions for acknowledging the customer's order, by the provider of the good or service, via at least the provider-side software application and transaction server by sending a confirmation to the customer-side software; wherein the method reduces a wait time for a receipt of the ordered good or service.

In yet another aspect of the disclosed embodiments, a system for providing location and time-based scheduling of preparation and delivery of goods and/or services is provided, comprising: a customer-side software application resident on a customer's portable smart device, configured to receive a customer's order of a good or service, and communicate the order information and customer's current location information to a transaction server, wherein customer's current location information is determined from a geo-location capability of the customer's portable smart device or from a fixed-location code accessed by the customer's device, the fixed-location code being situated at a pre-determined location at a provider's site by the provider of the good or service; a telecommunications link between the customer's portable smart device and the transaction sever, the link forwarding the customer's order, current customer location information to the transaction server, and customer account information to a provider-side software application on a computer of the provider of the good or service, wherein at least one of the provider-side software application and transaction server automatically determines an estimated time of arrival of the customer at the provider's site or, if the customer is at the provider's site, the customer's on-site location and wherein at least one of the provider-side software application and transaction server processes the customer's order, and wherein the provider-side software application schedules a time for beginning preparation for the ordered good or service by the provider by comparing a preparation completion time and at least one of the estimated time of arrival of the customer and the customer's current location information, and wherein at least one of the provider-side software application and transaction server acknowledges the customer's order by sending a confirmation to the customer-side software; wherein the system reduces a wait time for a receipt of the ordered good or service.

In another aspect of the disclosed embodiments, the above system is provided, wherein the fixed-location code is at least one of a barcode, RFID, QR code, photograph or picture, and a unique sound; and/or wherein, the customer account information includes at least one of banking, credit card, and billing information; and/or wherein the provider-side software application exchanges of the customer order to between at least one of a server, cook, and manager at the provider of the good or service and the customer-side software application is updated with a status of the customer order from at least one of the server, cook, and manager.

BRIEF DESCRIPTION OF THE DRAWINGS

FIGS. 5A-E illustrate initial restaurant selection (with location) and menu categories and are self-explanatory.

FIGS. 6A-E illustrate various menu items and are self-explanatory.

FIGS. 7A-F illustrate various ordering options and step, culminating in confirmation of payment, and is understood to be self-explanatory.

FIGS. 8A-D illustrate various scanning operations, confirming check in, and is understood to be self-explanatory.

DETAILED DESCRIPTION

Figure 1:
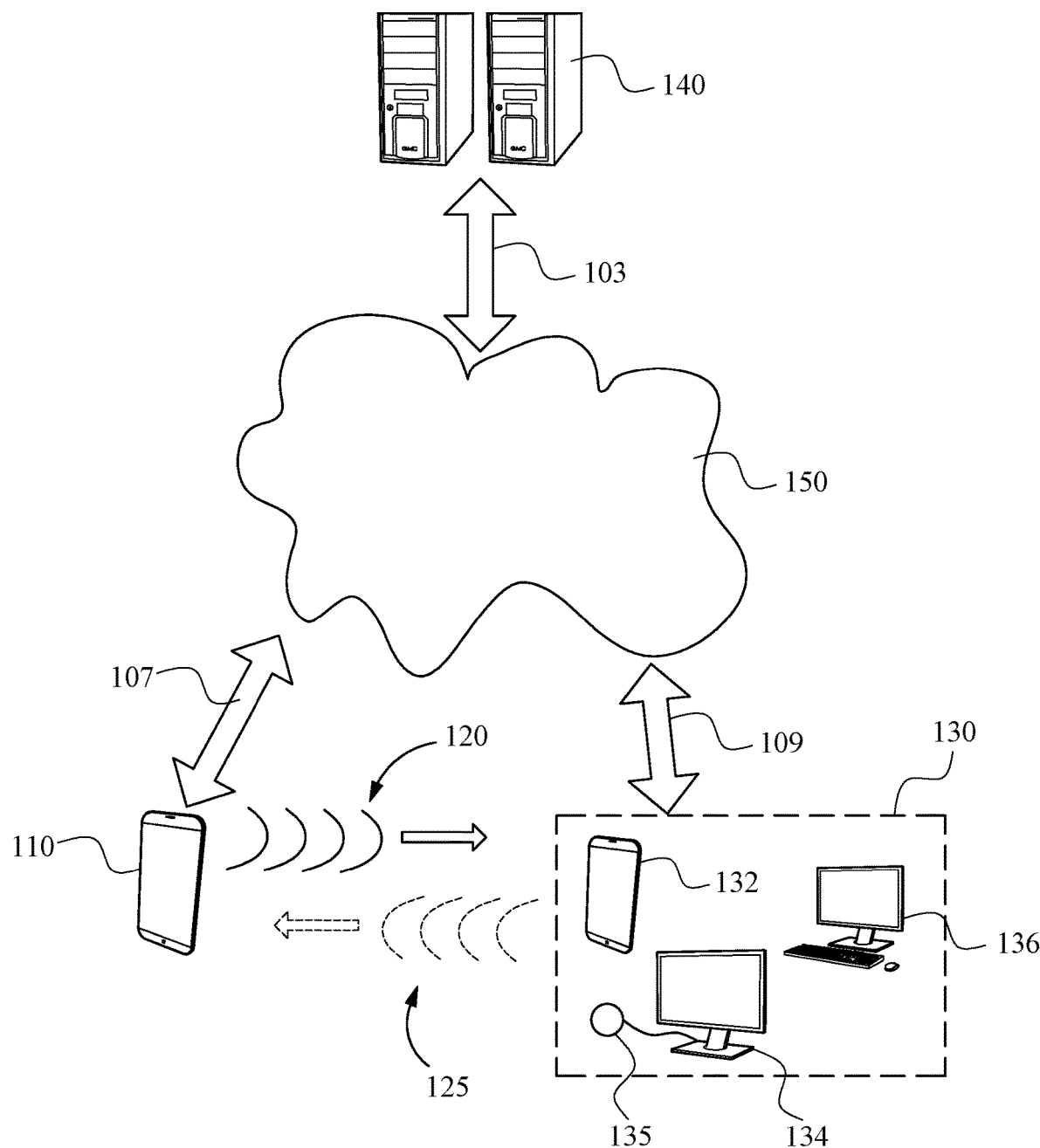
FIG. 1 is an illustration of sample hardware support system.

Some of the deficiencies of prompt and correct service in the prior art are due to a lack of integration between various "interactions" between the servicing entity and the receiving entity. For example, in the prior art, there generally is a disconnect between the "interaction" when entering a servicing entity (e.g., waiting, seating, etc.), the actual ordering of goods (e.g., drinks, appetizers, main course, getting orders to the kitchen, etc.), re-ordering (e.g., refills, change orders, etc.), finalizing the payment (e.g., separate bills, etc.), receiving a physical or electronic receipt, etc. That is, a physical person (either the same or different) is required for each interaction, which can be the source of delays and errors.

The exemplary systems and methods described herein attempt to off-load this requirement to an automated system that links the servicing entity's services/goods to the receiving entity's desires/orders. This streamlines the inherent process and bypasses the bottlenecks found in conventional approaches. Moreover, by careful placement of location indicators within or about the servicing entity, prompt services can be facilitated without having the servicing entity to physically monitor the servicing area.

Specifically, the exemplary system, in various embodiments, avoids the experience of having extended wait times for ordering or to paying for or picking up, for example, food or drinks. Further, the experience of eating and socializing becomes more pleasurable due to the non-disturbance of the customers by an intruding waiter or attendant. For the restaurant, bar or shop it saves a tremendous amount of resources usually needed to take food orders or process payments. It enables restaurant to deliver more food and serve more customers in the same amount of time. Accordingly, businesses will need to devote less personnel resources for a given service, thus reducing their bottom line.

In addition to standard food order systems this system allows the customer to skip the ordering, receipt of goods and payment process in a restaurant or at a counter by ordering the food or beverage directly for delivery to a defined location in the Bar, Restaurant, Drive Thru Teller or Pick-up counter. While the exemplary embodiments are described in the context of a restaurant, other businesses requiring timely presentation of their goods to a customer can benefit from the described systems and methods.

Various fictitious scenarios are described below, comparing prior art difficulties and how they are addressed with an exemplary software system called here as Eatelli, a trade name utilized by the inventor. It should be noted that while the examples are in the context of a restaurant, the exemplary features described herein, can be leveraged to other businesses, ventures where prompt delivery of goods/services to an arriving customer is desired.

Scenario 1: The Number to take to the table Restaurant—
Every Tuesday one of the girl's moms, her name is Betty, picks up the four girls from volleyball. As all moms she takes the girls to BestBurger, the girls favorite place. They get there and since it is dinner time, she meets all the other moms with their girls & boys in line waiting to order. The girls are chatting around and by the time they finally get up to the point of sale, haven't decided what they want and start discussing the menu. Finally, they ordered all drinks and the food they wanted and get number 15 to place on whatever table is available. Too bad the best table is already gone and the girls are mad. "Hey that is not my fault," she thinks.

Scenario 1—

Modification according to an exemplary embodiment: The next day it is Laura's turn. She is Debby's mom. In the car and before leaving she hands her phone over to Debby. Debby knows how that works and starts the exemplary Eatelli App, chooses BestBurger and makes her and mom's choices. Then she hands the phone over to the other girls. Each one of them chooses what they want for dinner. Arriving at the Best Burger place, they laugh about the line all the other team members are standing in and go straight to their favorite table. While the girls are chatting Laura sits back and checks in with Eatelli. Eatelli tells her it will be 3 more minutes before the food arrives. Laura thinks that this saved her at least 15 minutes standing in line and ordering in the store. Time she really needs to make it in time to meet with her girlfriends at her favorite bar. While leaving the Best Burger place she thinks. "Didn't they used to have three registers?" Now it is only two. "This is probably to compensate the minimum wage increase", she thinks before leaving the restaurant.

Scenario 2—

The Bar: Betty, Laura and the other mom's meet once a month at the Tiki bar. They got to know each other over the girls' volleyball team. It is crowded like always and because of this, Betty did not get to haul over Pete, the cute waiter. It almost seems he ignores her. "Well I guess I should have given him better tip last time", she thinks. Too bad she had to order the first round of drinks again, because she was the one being late. It took so long to feed the girls again. But that was the rule. The last one in pays the first round of drinks. She wonders how Laura always manages to be the first in the bar even when she takes the girls to dinner.

Scenario 2—

Modification according to an exemplary embodiment: Laura is thirsty from that salty food and was the first in the bar as always. She watches Betty is having a hard time getting the waiter's attention, but she also notices that the bar has Eatelli tags on the wall and on the tables. She checks her Eatelli app and yes the bar finally has joined the club. She orders really fast 3 Ale beers and a glass of Merlot for Betty and checks in at the closest Eatelli checkpoint located on the wall right behind her. Betty still couldn't place her order but is really surprised when Pete, the waiter shows up with all the drinks she didn't even get to order. And while they try to figure out how Pete knew where to bring the right drinks, Laura just smiles and cheers to the girls: "This one's on me". And while the girls can't believe what just happened, she tips Pete using Eatelli again. "That look on their face was worth it", she thinks.

Scenario 3—

The formal Dinner place: Laura's and Betty's families go out on every first Friday of the month. They have been going to that Pizza place on $5^{th}$ Ave. for years now. Reasonable prices, good pizza and a nice full service ambience are what they like. This time she thinks it is time to share the Eatelli secret with Betty. While Roger is trying to get the kids ready to go, she orders the coke Pitcher and Pizza for her family and sends an invitation to Betty. And since they agreed on splitting the bill she chooses "Split bill" rather than "I treat" on the Eatelli App. Betty gets an email with a link and downloads the Eatelli app. She sees that Laura has ordered and adds to the order. Now she finally understands Laura's secret. When the families arrive at the restaurant they get seated right away and at the table they check in. It doesn't take long and the dinner arrives. Later the kids want ice cream and since Betty knows now how, she just orders it to the table. By now the waiter would have brought the check and they usually would start the discussion who's paying what. Well, not this time. It's all taken care of. This is great, she thinks, "I won't be late at the bar next month, I will take the girls to that new Eatelli enabled dinner place she just found on the app." While leaving the restaurant Laura recognizes that the party on the neighbors table just got their entrée and thinks: "No wonder they gave us 5% using the Eatelli App. They can sell our table more often again tonight."

Scenario 4—

The Coffee Shop: "Oh no, my coffee is cold again", thinks Roger, who is Laura's husband. The Mooncoffee app is not bad, it lets me order everything online, but if you don't make it in time the coffee is cold. And you never know whether they called your name already before you entered the store. Then you wait and finally ask one of the baristas. Today again, the answer was: "Oh yeah that is ready. It has been sitting here for you quite a while."

The next day Roger tries out Zamunda, the new coffee shop in the mall next door. He saw that they support Eatelli, the App that Laura is so happy about. He orders the Latté, not the standard, the one with one extra shot and low fat milk, just the ways he likes it. Not much of a difference he thinks with the order process. When he arrives at Zamunda's new store. He sees the Eatelli check in right at the door and "checks in" letting Zamunda know he is inside the shop. It doesn't take long and somebody calls "Roger, Latte one extra shot" and hands it over to Roger. Roger smiles. Didn't take longer and it is still hot and freshly done.

Scenario 5—

Drive Thru: Back in the car Roger remembers that last time he came back to the office his boss wanted a Latté like his. Naturally Roger insisted to give him his, he is the boss, but this time he will be prepared and just get another one. While he sips on his coffee, he is glad that Eatelli lists what he ordered the last time and with one click the order is out the door. He drives up to Zamundas drive-thru teller and checks in with Eatelli. "Letting them know what I want was never that easy", Roger summarizes. It doesn't take long and he gets the coffee for his boss.

Scenario 6—

The Lunch Pick Up Place: On his way back Roger makes a quick stop at the lunch place. They have the best organic homemade sandwiches in town. After checking in at the Eatelli sign it only takes a minute before he hears his name and can leave with the sandwiches for the whole team. And the best thing is everybody paid already for his own order. He smiles when he walks out the door with his order, while the guy that entered the store in front of him is still the last in line. And when he comes back he has to collect the money for each order. "That will take him half of his lunch break", Roger thinks. And the best thing is Roger paid 10% less, because he ordered before ten. That gave this place time to prepare his lunch when it's not so busy. "Well, I guess they get to sell more when they get in the lunch orders early. Eatelli is really a good deal for everybody", he thinks and smiles.

Scenario 7—

Lunch Business Meeting: The legal firm Business Matters & Partners is having a client over for lunch. Ben, one of the partners is running a meeting negotiating a huge M&A contract and the negations take longer than planned. The next meeting is coming up, so the only chance to get this deal closed today is to continue meeting during lunch. Bens assistant Jimmy starts the Eatelli app chooses the casino restaurant on the upper floor and hands the phone over to his boss and each clients to make lunch choices in the casino on the top floor. Before he does he sends and invite to the interpreter who before he places the order he chooses the "do not disturb option" the app and the restaurant provides. Once they arrive at the casino he scans that he arrived and his boss can keep discussing the important last steps towards closing the M&A deal. The nice thing is, that they won't be disturbed about the beverage or the food order or the payment of the lunch. Like magic the food arrives at the table and they can discuss and leave without being disturbed once. Jim thinks that the next time he takes his family he will also choose the "Do not disturb" option. It gives so much more social time not being interrupted all the time.

As evident in the above-described fictitious scenarios, the exemplary system overcomes many deficiencies in the prior art. In addition to the above examples, a customer may "check-in" at a table, bar or service location, by scanning an appropriately placed scan code at the table or selected location. Therefore, the customer can "self-check in" by use of their smart phone/hand-held device to a specific table, for example. In various embodiments, the check-in may simply be a co-location of the customer with the servicing institution's location (preferably, but not necessarily, a confirmation of some sort would be clicked on by the customer to verify the check-in) This obviates the delay that is typically associated with servicing seated customers. In some embodiments, the scan code can be indicative of not only the "table" the customer is waiting at, but also the position/location at the table. This is particularly applicable during busy servicing times such as during lunch or happy hour, where personnel resources are most challenged. In principal, the automated system off-loads the check-in process typically handled by the restaurant staff to the customer via the exemplary software on the customer's smart device.

It should be evident that in addition to checking-in, the exemplary system can be used for ordering services/goods, thereby reducing the intake load of the restaurant staff. Further, coordination with the customer's corresponding software application can be used with the scanning feature to link a customer's prior order to his/her current position or location at the delivery premises. For example, upon entering a "take-out" window of a restaurant, the customer may scan in (or alert via the software) that he/she has arrived. Thus, the exemplary system is made cognizant of the geographic position of the recipient as well as "when" the recipient has arrived, without requiring the attention of restaurant personnel.

As commonly experienced by nearly everyone, when a restaurant is busy and a customer has arrived for a pickup, the wait time in a generic servicing queue handling new orders as well as pick-ups can be long. The exemplary system notifies the restaurant personnel/system that the pick-up customer does not need "new order" attention, but is only there to pick-up.

Paramount in this is the understanding that location by itself is not a sufficient enough parameter for queue reduction. When the customer has arrived at the location, the exemplary system is also synergistic, as it can also provide a time window, for when servicing or receipt of goods is to be provided. For example, in a typical restaurant situation, a waiter must canvas the servicing area for any customer wanting service or attention. If the waiter is busy or away from the seating area, or a view of the customer is obstructed, the customer may have to wait a long time for service—a constant source of frustration for many customers.

However, if the customer alerts the staff/waiter via the exemplary software, wherein, for example, a "map" of tables or customers is linked to a response station, other staff members can respond accordingly. In some embodiments, the exemplary software may be operating at a portable or handheld servicing device, in possession of the waiter, thereby avoiding a central response station. A good example where this operational embodiment would be effective in, is for the occasional refill of a drink, understanding that it is difficult for a busy waiter to be timely aware when a customer is need of a drink refill, simply by canvasing the service area for empty glasses.

As is apparent, the exemplary system significantly reduces or removes the typical wait times associated with conventional restaurants and similarly waiting "queued" servicing institutions without installing any kind of device at the table or bar. That is, no call button or institution-supplied device is needed. It also provides advance notice to the restaurant or servicing institution of when, depending on design implementation, the approximate time of arrival of the customer occurred, as well as actual arrival. As well as notifying the customer of any delays. As can be apparent, the exemplary system significantly automates the ordering exchange conducted by waiters, staff and more efficiently tracks a customer's order via computerized systems. Additionally, multiple parties can "scan" in their respective orders at a common table, and the bill can be automatically parsed accordingly, rather than having the waiter sort it out after the fact. It goes without saying that the exemplary system, in a given embodiment, can be designed to take most of physical activity and burden associated with the "ordering" and "billing" off the staff so that the order as well as the bill can be electronically provided (and accurately) through the exemplary system.

For example, the bill could be brought up for viewing via the Eatelli app and then approved, and emailed to the customer's email. Thus, an electronic record of the transactions could be tabulated. Off course, similarly, the servicing institution could avoid the need for paper receipts (and overhead associated with loss/distortion/mis-accounting) and have their Eatelli-driven services completely electronically managed. The exemplary system saves tremendous resources at the retail location because the order and the payment process can be done by the customer ordering process or while visiting the restaurant, rather than after arrival.

Further, in various embodiments, a customer can, after completing his own order, send out an invite to another customer or group to have them add the items they would like to receive at the restaurant's location at the chosen time. This enables people that want to meet at a given location, combine the orders, which will be served jointly. Invited requests can be communicated via the Eatelli app or via the operating system of the smart device. The customer can choose to invite other customers and also pay for them, if so desired. If an invite is initiated by a given customer, a time window can be affixed to the invite, enabling joining within a specified period. After the expiration of the period, the invitation may be automatically withdrawn.

Thus, a "guest" or "meeting" scenario can be implemented, allowing different parties to join in the ordering. The latter arrangement is specifically valuable for large groups that ask for individual receipts. The automated system can avoid the confusion typically found with group orders when finalizing the bill among the party. In some embodiments, an option to allow individuals to "tag" their purchases from the meeting bill may be implemented.

In view of the various capabilities described above, the following figures provide detailed aspects of several of the disclosed embodiments. It should be noted that while the various embodiments are described in the general context of a restaurant, any retail operation or servicing center (food, goods, activities, etc.) can be used.

FIG. 1 is an illustration 100 of sample hardware support system comprising one or more servers 140 connected 103 to a network cloud 150 (for example, the Internet) with secondary connection 107 to a customer's smart device or smart phone 110 running an exemplary embodiment via a software application/app (e.g., Eatelli). The customer's smart device or smart phone 110 can be a watch device, glasses device, virtual reality device, notebook or computer, or any communication device capable of performing software execution and interfacing with the user. Network 150 also is connected 109 to the service system hardware, typically situated at serving location (restaurant, store, etc.) 130. Communication between the customer's device 110 can also be facilitated, in some embodiments, directly to the service location hardware 130 via a local wireless communication 120/125 to any one of the service location hardware 130. The service location hardware 130 can comprise one or more of a server/PC 136, Point of sale terminal 134 with optional microphone/data reader 135, or smart device 132.

The servers 140 are loaded with server software that supports the Eatelli app that is running on the customer's device 110 and also on the service location's hardware 130. The Eatelli app can be downloaded from a link of a retailer's website or received from a retailer, or available at an app store. Customer requests for any of the actions described above is invoked via the Eatelli app, the requests being forwarded to the servers 140 and processed and then instructions/status(es)/requests/actions forwarded to the supporting hardware 130 at the service location, also running a service version of the Eatelli app. In some embodiments, the requests may be speech driven, eye movement driven, keyboard driven, gesture driven, and so forth. In various embodiments, the service station side version may simply be a web site with permission-based access that is hosted by the servers 140 or a proxy thereto. Service side replies, bills, receipts, status(es), etc. can be routed back to the customer's device 110 from the supporting hardware 130 via the servers 140 or directly 120/125, according to design preference.

Figure 2:
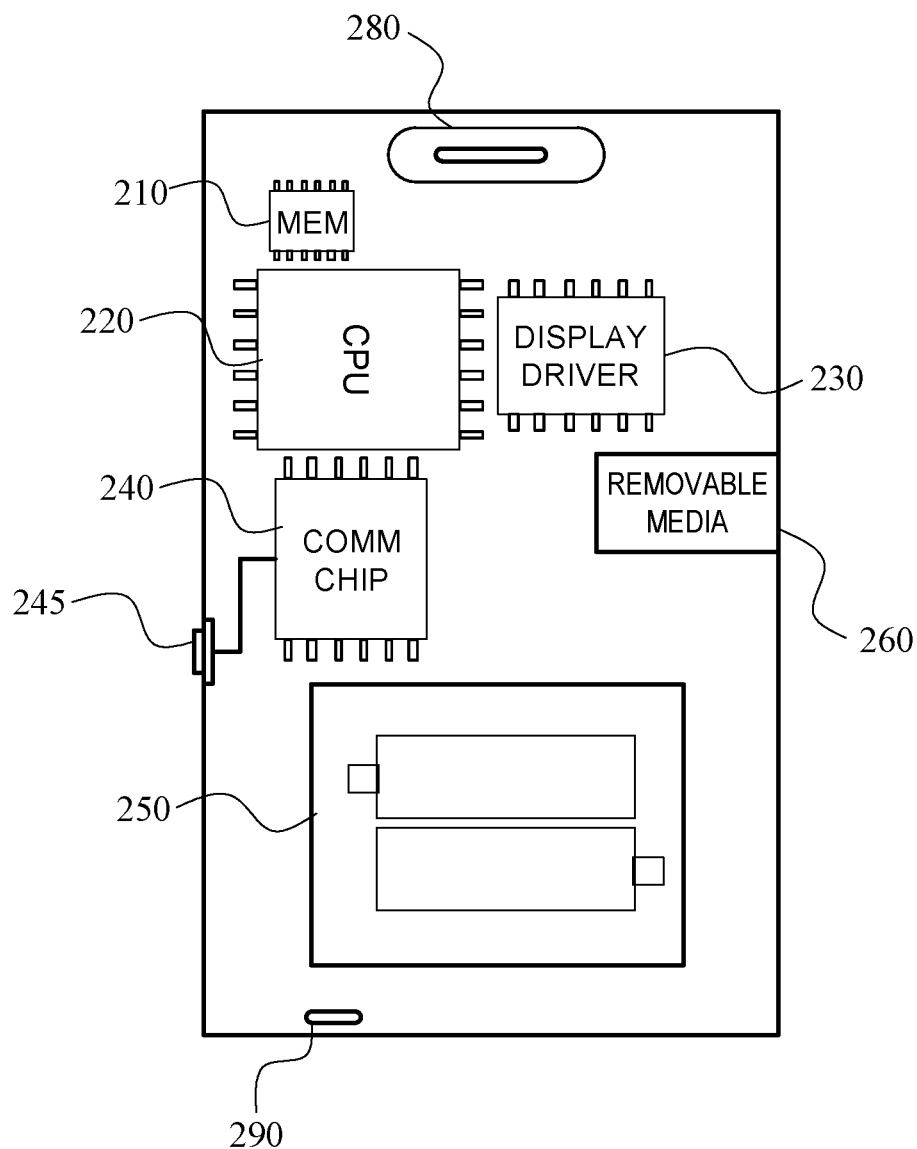
FIG. 2 is an illustration of various hardware elements typically used in mobile smart device or smart phone or mobile personal computer.

FIG. 2 is an illustration of various hardware elements typically used in mobile smart device or smart phone 200 or mobile personal computer. Depending on the sophistication of the hardware elements, the mobile smart device 200 can be made to be equivalent to computer, being miniaturized for portability. As a computing device, mobile smart device 200 will contain processor 220, memory 210, display driver 230, communications chip 240 connected to external interface 245, optional removable memory medium 260 and external interface 245 which may take the form of a IN/OUT port or an antenna for wireless transmission. Also illustrated is power source 250, speaker 280 and microphone 290, some of which may not be necessary but are shown here for completeness. The processor 220 may also contain on-chip memory (not shown). The removable memory medium 260 operates as memory storage and can take many forms, such as a USB drive, SD card, floppy disk, CD-ROM, or any conventional removable format for memory that is used in the computer industry.

It is understood that depending on the size of mobile smart device 200, memory 210 may be supplemented with additional memory such as, for example, a hard drive (not shown) either internal to mobile smart device 200 or external to mobile smart device 200. In an external scenario, the external memory (e.g., hard drive(s)) can be arranged to communicate via communications chip 240 or another interface chip.

For larger computer systems, memory will be distributed among hard drives (or an analogous form of external memory—e.g., solid state drives, optical drive, tapes, etc.), the details of which are well known and understood in the industry. In these larger systems, multiple processors 220 may be used and, as the various hardware elements are scaled for higher performance and capabilities, the form factor will also scale upward resulting in the computing device to be tantamount to a desktop computer or server. Accordingly, many of the same hardware elements described in FIG. 2 are found in desktop computers, servers, secondary devices, terminals, and so forth.

As will be appreciated by one skilled in the art, in an aspect of some embodiments of the present disclosure and of the "computer", described in FIG. 2 (and by inference to the servers 140, service hardware 130 in FIG. 1), may be embodied as an apparatus that incorporates software components. Accordingly, some embodiments of the present disclosure, or portions thereof, may combine one or more hardware components such as microprocessors, microcontrollers, or digital sequential logic, etc., such as processor 220 with one or more software components (e.g., program code, firmware, resident software, micro-code, etc.) stored in a tangible computer-readable memory device such as memory 210, removable memory media 260, CPU memory (not shown) that in combination form a specifically configured apparatus that performs the functions as described herein. These combinations, when presented as such, can form specially-programmed devices which may be generally referred to herein "modules".

The software component portions of the modules or functions, steps, operations that are part of Eatelli process, may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that the described functions are performed by separate processors and/or computing hardware platforms. In addition, some embodiments of the apparatus may include a tangible computer readable medium containing non-transitory instructions stored therein that when executed by a processing device cause the processing device to implement the methods as described herein.

It is understood that the specific order or hierarchy of steps in the processes disclosed is an example of applicable approaches. Based upon design preferences, the specific order or hierarchy of steps in the processes may be rearranged while remaining within the scope of the present disclosure.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such that the processor can read non-transitory information from, and write non-transitory information to, the storage medium.

Figure 3:
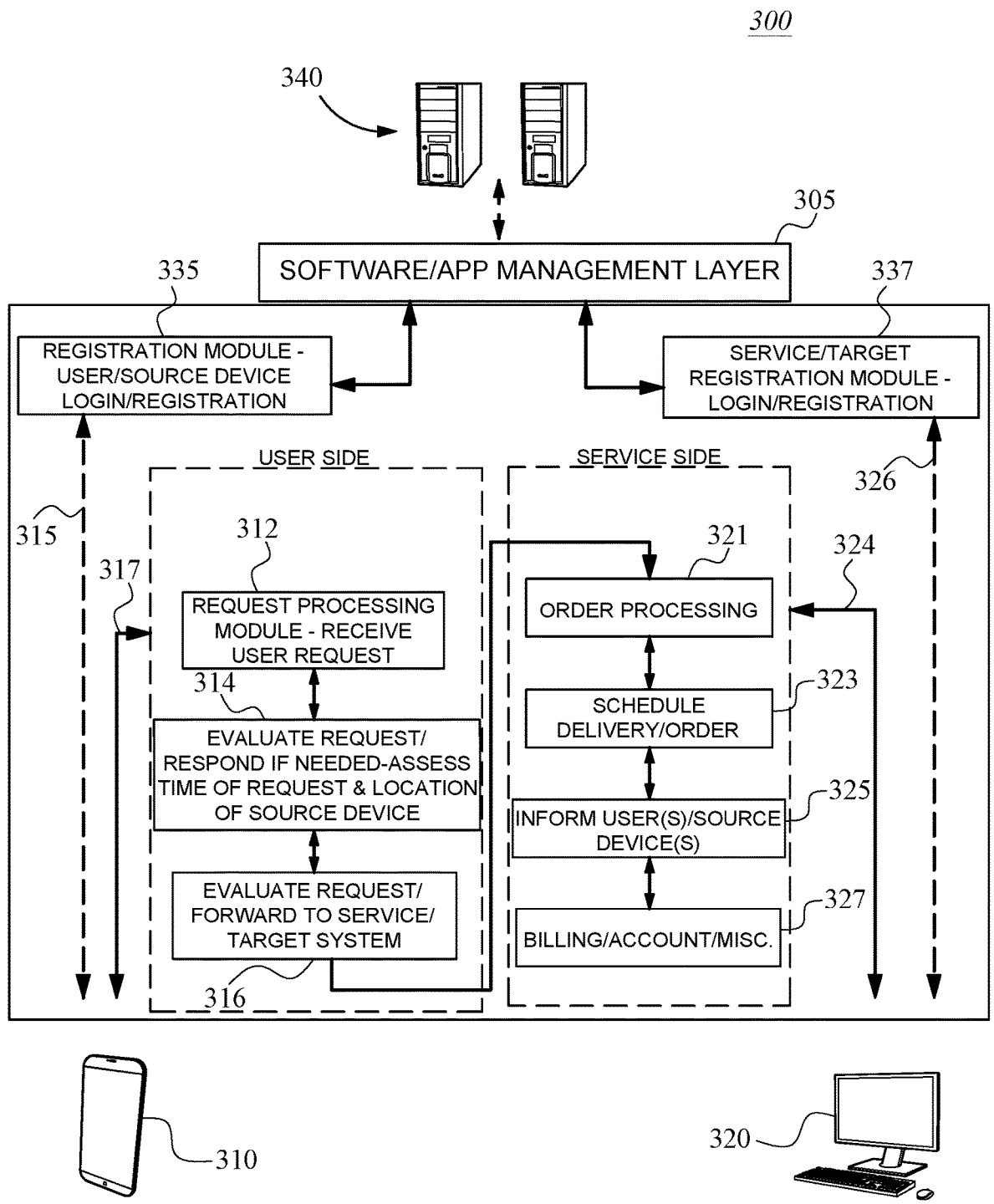
FIG. 3 is a block diagram of process detailing operations/modules of an exemplary software/app management layer for supporting Eatelli.

FIG. 3 is a block diagram of process 300 detailing operations/modules of an exemplary software/app management layer 305 for supporting Eatelli. The software 305 can be resident on the Eatelli server(s) in its entirety or portions thereof may be resident, understanding that some aspects of user interaction/authentication may be off-loaded to the user-side device 310 as well as the service interactions off-loaded to the service-side device 320. The user of mobile device 310 is understood to have an account with Eatelli server(s) 340, which is processed by a registration module 335. In some embodiments, the account registration process may be circumvented for a user desiring to operate as a first-time-user or guest. Thus, registration for the user will not be required.

For user's wanting registration, registration via registration module 335 is accomplished by mobile device's 310 connection 315 (may be Internet, or any other form of wireless/wired network) with transaction server(s) 340 or via another terminal (not shown). For example, the user may begin registration via a desktop computer and subsequently login (or have access to) to the transaction server(s) 330 via mobile device 310. Once registration 335 is completed, wherein user/account details are procured, mobile device 310 can initiate a transaction with secondary device 320, which represents the service side hardware (e.g., restaurant, etc.). The service side's secondary device 320 is also "registered" with Eatelli via a similarly configured registration module 337, however, adapted with software for service providers. Connections 315, 326, 317, 324 represent physical connections and/or communication requests and can be via Internet or any other form of wireless/wired network.

After registration, the user can request a service or good via his Eatelli app installed on his mobile device 310 via connection 317 directed to the request processing module 312 of exemplary software 305. Request processing module 312 (in some embodiments, in conjunction with module 314) operates to authenticate the user, account information, and one or more of banking/credit card information, location of user, prior ordering history, suite of services in response to user's request, list of providers/services, cross-reference to reviews of the service/goods providers, etc. In some embodiments, software 305 in module 312 will evaluate the traffic flow between the user's location and the desired service location for travel time estimation, offer a suite of services in response to the user's request, evaluate prior order parameters, current service location's wait time, response parameters from the service location, and so forth. These parameters allow the exemplary software 305 to give a better estimate of when the customer's order will be ready, and if there are any traffic or delivery related time concerns.

For example, user may want to order a double cheese, thin crust pizza for pick up. Software 305 provides him, for example, a list of nearby pizza joints, or optionally his last pizza order, favorites, and so forth. In some embodiments, the software 305 may scan the vendors/service/goods providers to determine if there is a provider that can facilitate the order within the desired time constraint or other user-directed preferences. Methods for scanning using a smart device or smart phone are well known in the art and, therefore are not elaborated herein.

After module 312's processing, the user request is forwarded to evaluation module 314 that has one or more of the parameters described above. Module 314 may be integrated into module 312 or be a standalone. Module 314 is primarily geared to the service-side parameters, such as availability of servicing the order (e.g., in stock, etc.), estimated completion time, and so forth. So, in principal it "holds" the service side parameters for comparison to the user side parameters 312, and provides additional information, which is forwarded to the user for user response. For example, there may be a sale that day, which the user is not aware of, which module 314 provides to the requesting module 312, which then forwards to the user's device 310.

Further, depending on the time of day, work load, the service location may offer a discount for different arrival times, or party sizes. That is, the service (e.g., restaurant) may offer different pricing for different arrival periods. A restaurant usually can only handle a certain amount of orders at the retail location at certain times. Since, in prior art systems, the restaurant only knows what gets ordered when the ordering customer arrives, if the restaurant gets the orders in earlier than when the customer arrives, then the restaurant can prepare the orders and hand out the prepared orders, in addition to the orders taken in the store. In some embodiments, the pricing can be lowered if ordered ahead of the schedule arrival time.

After evaluation of the user's request with the service side parameters, the "order" is forwarded from the user side to the service side via module 316. Module 316 can compare/parse the information from modules 312 and 314 to formulate a scheduled order with the service/goods provider. For example, credit card information can be extracted from module 312 and bundled with the scheduled order, to order processing module 321 on the service side.

Order processing module 321 is performed on the service side and generally processes the user's order in consideration of any particular preferences offered by the service/goods provider. For example, if the user is a repeat customer, some additional information or perks can be added to order parameters (e.g., free delivery, etc.). After processing 321, the order is scheduled/queued 323 in the service/goods area (e.g., order entered into service/goods' management system for order acceptance).

Next, if the order is accepted on the service side, the user is informed via module 325 and any billing/accounting information is processed in module 327. Module 327 can be invoked when a transaction is at a given stage, to provide the user a unique identifier or transaction identifier. The unique identifier/transaction identifier "tags" the user's device with the transaction so that when the user arrives at the service/good's location, the transaction details can be determined from the user received tag. The identifier will "track" the transaction through its various stages, such as ordering, receipt, payment, so forth. By uncovering the "tag," the service/good location can match its orders with the user's order, for order completion.

In some embodiments, module 325 is used to facilitate the invitation of a order to other parties (not shown). That is, a user can, after completing his own order, send out an invite to another user or group to have them add the items they would like to receive at the service/good location at the chosen time. Here, the user sending out the invite can decide whether to pay for the invited orders or have the invited user(s) pay for the items ordered. This can provide a surrogate payment system where other parties to the order can pay for their own portion of the order, or pay for a different portion of the order.

Various software applications or forms thereof can be utilized on the secondary device 320, for supporting the Eatelli app used by the user. For example, the service location can download a different "business-centric" app to device 320 and set up the account information, including menu(s), pictures of the location, address, pricing, calories, etc. that assist the user in making their decisions. In view of the time-sensitive aspects of the system, the service side may include the preparation time for each item on the menu, so the user can better gauge their "wait" or delivery time. Loading retail information into a retail website or app is well understood, therefore, they are not further elaborated herein.

In the event the service side has several service locations within its site (e.g., bar area, lounge, dining area, etc.), certain menu items may have the option to be delivered to a specific site. For example, alcoholic drinks could be directed to the bar area or to an over 21 dining area. In view of the selectability of the menu items, their respective bills and/or printouts could be similarly directed to the appropriate section of the service location (e.g., drinks receipts could be printed out at the bar, while food receipts printed out at the kitchen).

It should be understood that the above modules may be further segregated with additional functions necessary for on-line ordering, according to design preference. Similarly, the above modules and/or steps may be reduced or integrated into less modules/steps. For example, user side operations could be handled by a single all-in-one module running on the user's device 310 while service operations could be handled by a single all-in-one module running on the service provider side hardware 320. Thus, various modifications and changes may be made to the process described above without departing from the spirit of this disclosure.

Figure 4:
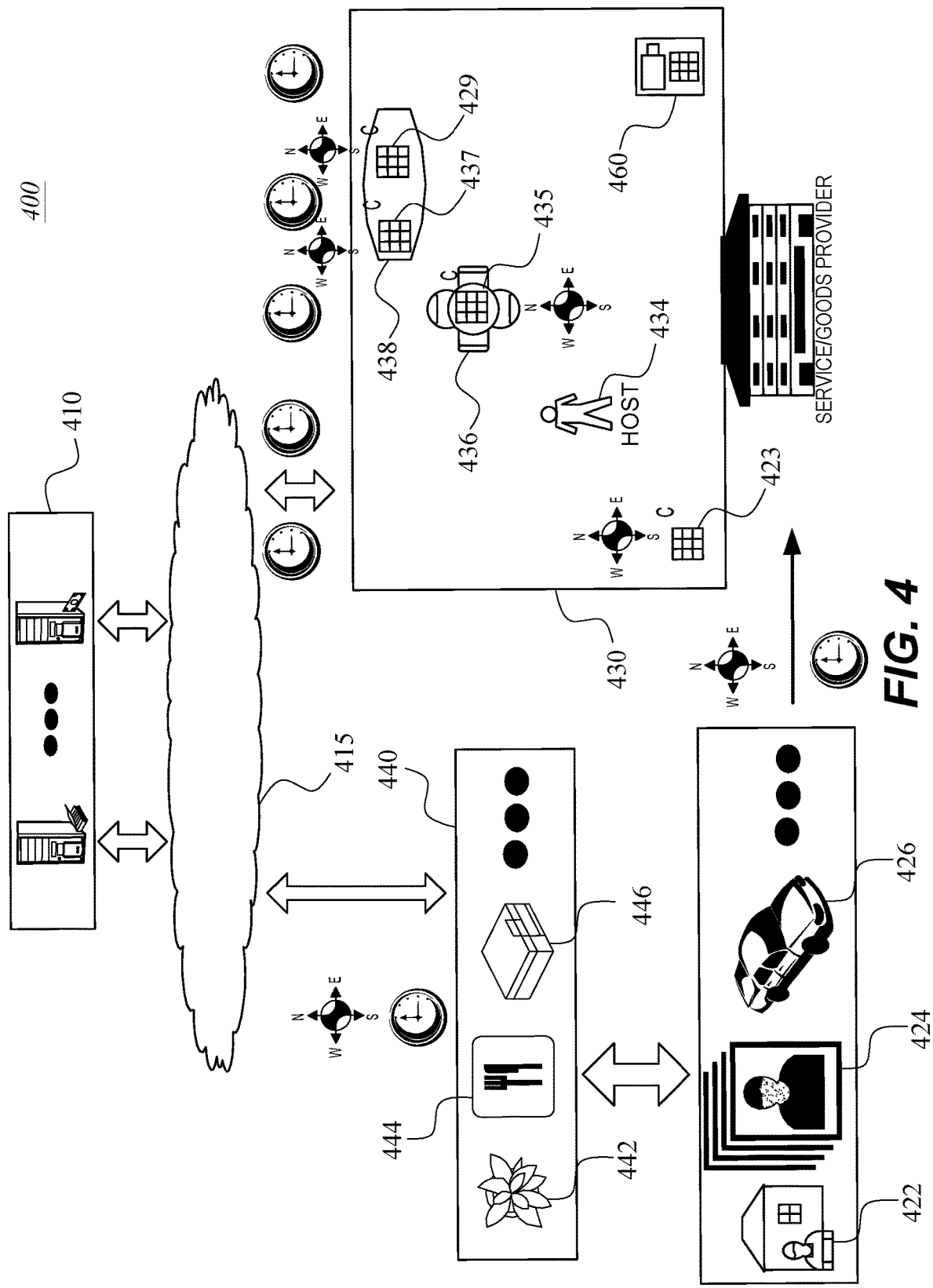
FIG. 4 is a diagram illustrating various location sensitive aspects of an exemplary Eatelli implementation.
Figure 5C:
Figure 5D:
Figure 5E:
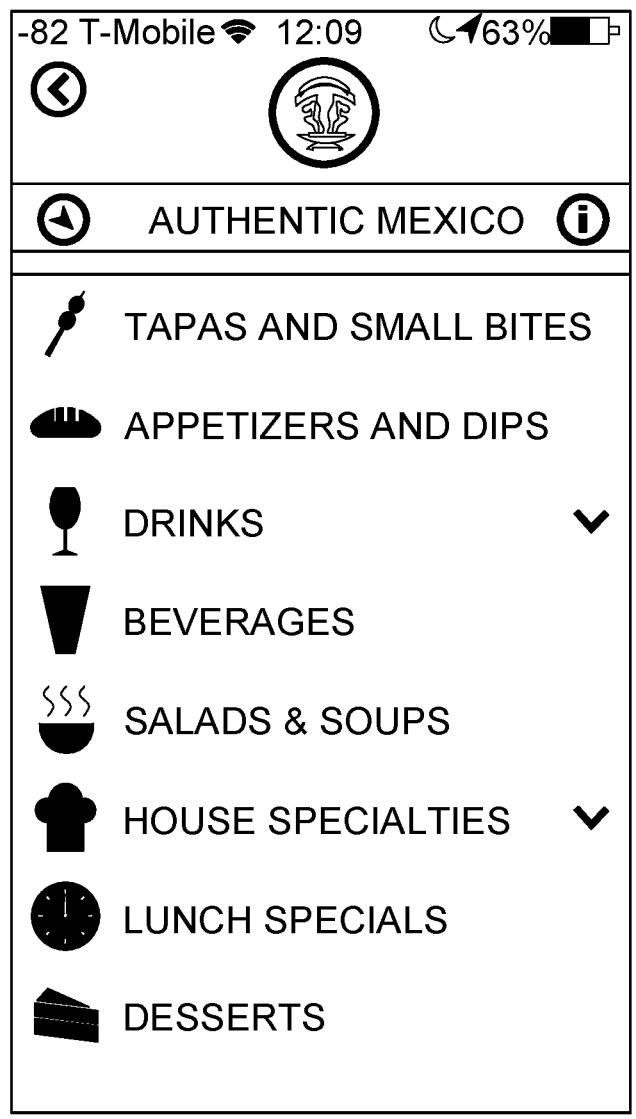
Figure 6E:
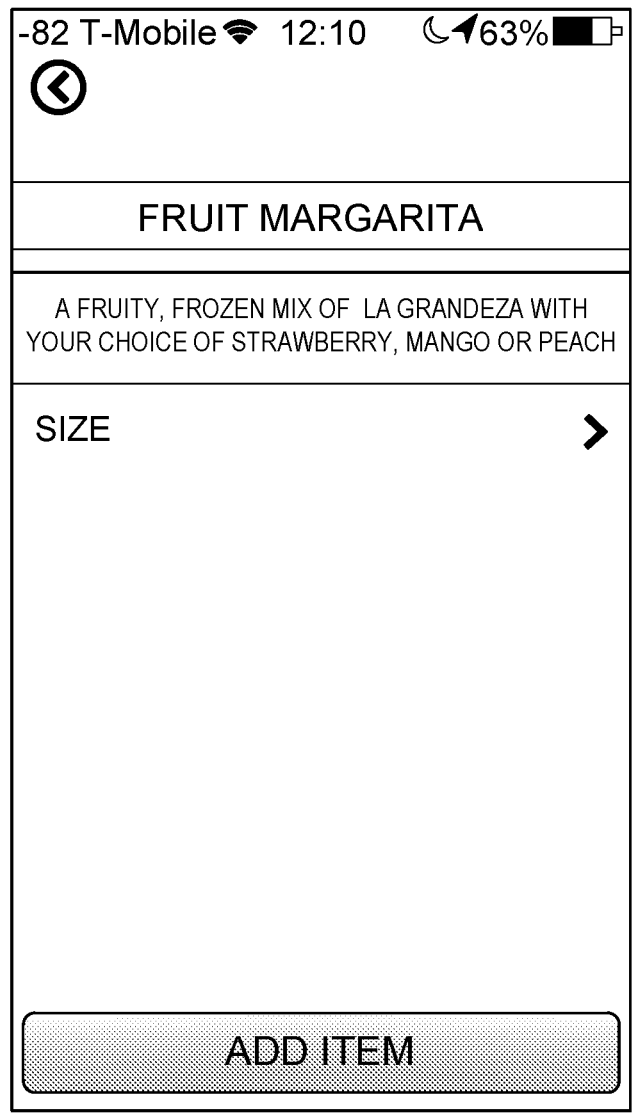
Figure 8A:
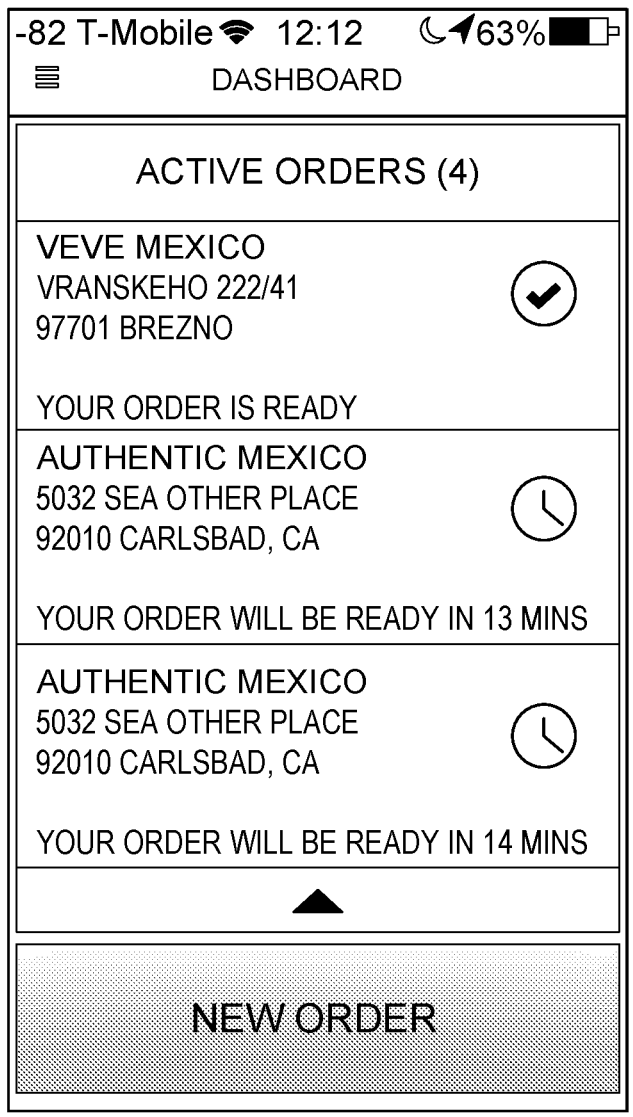
Figure 8B:
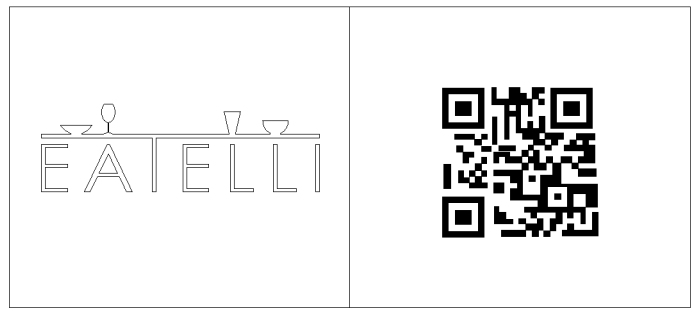

FIG. 4 is a diagram 400 illustrating various location sensitive aspects of an exemplary Eatelli implementation. Server(s) 410 host the Eatelli servicing software and are in communication with one or more users 420 and goods/service providers 430, via a common network 415 (presumably the Internet). Users 420 can comprise someone at their home 422, other location 424, in a car 426, etc. Service/goods providers 430 have their services/goods menued for access by a user, shown here as categories for selection (e.g., flowers 442, food 444, shopping 446, etc.) in menu 440. User in block 420 selects a desired service/good from menu 440, noting that both the user and service/good are time and location stamped, in the exemplary implementation.

One or more users may order a dinner from a selected restaurant from a food menu provided in menu 440, or make reservations. In this example, the reservation/order is for dine-in, so depending on implementation preference, the travel time from the user's location to the restaurant 430 may be computed as a factor for the restaurant's consideration. For example, the system may compute an estimated travel time of 25 minutes and the food being ordered may take 15 minutes to prepare. Thus, preparation of the order may begin within a time window that considers the travel time. In some embodiments, the preparation start time may be dynamically varied, depending on updated estimates of the arrival time.

Upon arrival of the user to the restaurant 430, the user's location information can be automatically sent to the restaurant's software for immediate prompting of the order preparation. In various other embodiments, a scan code 433 is situated at the restaurant entrance or other suitable location, wherein the user can "announce" his arrival by scanning the code. This mechanism guarantees that the user has indeed arrived, noting that scan codes will be different for different restaurants. Thus, false arrival indications can be avoided.

If the order is for pick-up, the pickup scenario described above can be followed. If the order is for dine-in, the host 434 can direct the user(s) to their table 436 which was reserved and made timely available either upon their arrival (via scan code 433) or their automatic entry notification via geo-location from the Eatelli app. It is understood, however, that a scan code verification of location is more precise and could be used as the primary means for verification of entry. While a scan code is described as the chosen method, other methods may be used, such as Radio Frequency ID (RFID), Quick Response Code (QR) code, a barcode or photograph or picture, a unique sound, etc. The restaurant owner/personnel can associate each unique identifier with a specific location within the restaurant. One possible approach is to take a picture of a unique barcode/identifier that is located at a designated area, and upload that image (or equivalent data, code, etc.) into exemplary system, wherein location information can also be associated. When a user scans that identifier, the exemplary system will notify the restaurant that the identifier (now having that specific location) has been used. As alluded above, the identifier can be something as simple as a label with a code that is attached to a specific location.

Table 436 is also labeled with a scan code 435 that the user can access for making an order, if their initial interaction with Eatelli is for table reservations only. That is, user(s) may use the restaurant's menu or the Eatelli app to order their food and use table 436's scan code 435 to proceed with the order. The scan code 435's location is preset in the restaurant's software side, so that any user-initiated or Eatelli use with a corresponding scan code 435 automatically lets the restaurant system 460 "know" what table the user is at in the restaurant. Thus, in some embodiments, the user may not need a host 434 to guide them to their table, if the Eatelli app configuration for this restaurant permits self-seating. A table reserved through the Eatelli app could be indicated to the user, so that the user can self-seat without the assistance of the host 434.

Upon seating, for one possible mode of operation the user may want to order food, and simply by scanning the scan code 435 be offered a food menu on the Eatelli app, wherein the user can proceed to make the order through Eatelli app. The reliance on the host 434 or a waiter to arrive to take the order can be obviated. It should be understood that if a scan code is used, that "ties" the user to the location of the scan code, until the user selects another scan code or options out of the location-based scanning. Of course, the user may relocate to another area having a different scan code. As can be seen, the exemplary system enables the goods ordered to be brought right to the location of the user, or in other words the location of the ordering customer is matched with the good.

Use of the scan code 436 dramatically changes the dynamics of restaurant service, bypassing the wait staff with orders going directly to the kitchen or management software that forwards to the kitchen. The wait staff do not need to be tied to handling orders but can provide food delivery and refill service. In some instances, the Eatelli app can have an option for a waiter to be called. For example, the user may have a question on a particular food item and thus request assistance. In other embodiments, the Eatelli app will have a "do not disturb" option, informing the service staff that the user does not want to be disturbed while eating their meal, or will discussing matters with others at the table. Thus, by automating many aspects of the ordering process, a restaurant can more quickly and efficiently provide service to its customers.

Proceeding with FIG. 4, the restaurant also can have a bar area, indicated here as 438 with multiple scan codes 437 and 429. This arrangement is similar to the previous example, except the scan codes 437, 429 denote specific locations/stools at the bar 438. Thus, individualized ordering and service can be provided. As is well known at a busy bar, service can be very slow. In some embodiments, the bar 438 may have an ordering station scan code (not shown), for customers wanting to order drinks but not wanting a seat at the bar 438.

Apparent in FIG. 4 is that threshold activity is "time stamped" so that when an important operation is invoked by the user, the exemplary system keeps track of the time elapsed. The elapsed time can be monitored to provide different levels of alerting to the attending host, waiters, etc. For example, if a service request by a user/customer has not been answered in a pre-determined amount of time, it may be elevated in the servicing queue or a different status indicator may turn on (e.g., green→yellow→red) in the service side software. Of course, as well as visual indicators, sound or other alerts may be activated.

It should be evident that the exemplary system is more than a simple ordering system. Restaurants, specifically restaurant chains have apps that available for use by customers. However these prior art apps are designed for ordering food and cannot provide any correlation between the order status and receipt, in the context of the customer's proximity to the restaurant. That is, while the prior art may show a map of the user's location to the desired restaurant, there is no mechanism for combining the location information with the order information for queuing, especially upon arrival of the customer to the restaurant. These prior art systems do not actually use the time vs. location information for order processing and preparation. Further, they do not provide any assistance to the customer when he/she arrives at the restaurant, via a location-base scan code or other location verifier.

Also, while some prior art apps may have the ability to make reservations, they stop there once the customer arrives at the restaurant. The prior art processes do not automate the "check-in" process or provide on-site ordering with location specific tagging via scan codes. Further, there is no app in the market that allows ordering "within" the restaurant in combination with a scan code or location indicator. Further, there is no app in the market that performs the on-site ordering described and also tabulates the bill.

It should be appreciated that the Eatelli app and system allows restaurants that do not have the resources to develop their own software for operation on their own devices, to obtain similar results with little investment. The Eatelli app and system provides a "generic" system that restaurants can tie into, while providing better levels of service than before. Additionally, it is understood that most restaurants would welcome such a system that bundles electronic billing, as it would remove the need for paper receipts, credit card processing machines and so forth.

In view of the above embodiments, various screen shots of a prototype software application are provided in the below FIGS.

FIGS. 5A-F illustrate initial restaurant selection (with location) and menu categories and are self-explanatory.

FIGS. 6A-F illustrate various menu items and are self-explanatory.

FIGS. 7A-F illustrate various ordering options and step, culminating in confirmation of payment, and is understood to be self-explanatory.

FIGS. 8A-D illustrate various scanning operations, confirming check in, and is understood to be self-explanatory.

Figure 9:
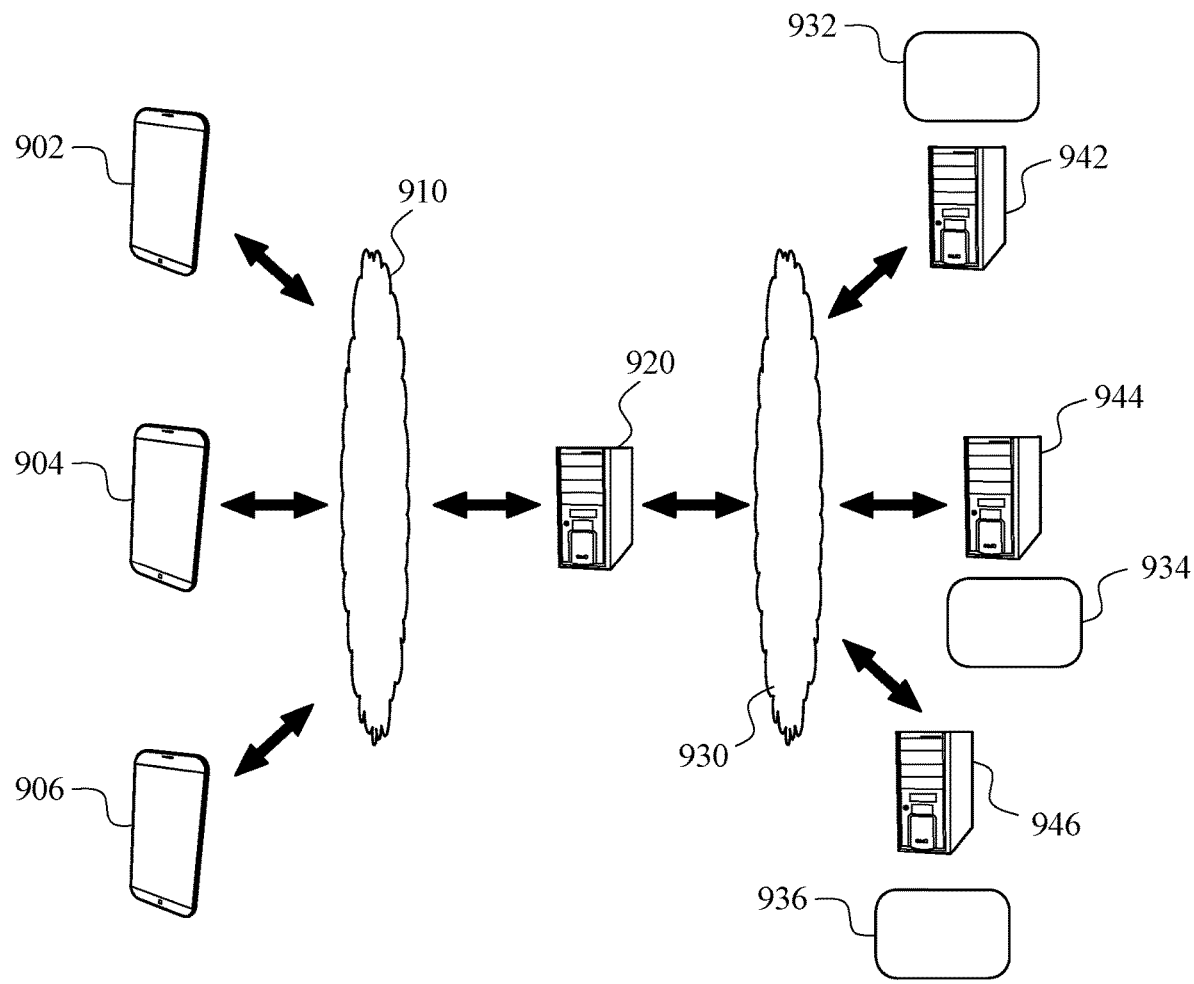
FIG. 9 is an illustration of a block diagram showing various smart devices having Eatelli software (e.g., app) installed therein.

FIG. 9 is an illustration 900 of a simplified top-level diagram showing various smart devices 902, 904, 906 having Eatelli software (e.g., app) installed therein for use by ordering customers. The smart devices communicate via wireless to connect to the "net" 910, 930 to Eatelli server 920, running Eatelli back-end software, managing one or more interactions interaction between the customer software on the smart devices 902, 904, 906 with the servicing entities' Eatelli software 932, 934, 936 running on the service provider's servers/computers 942, 944, 946 (and/or on the service provider's tablets or otherwise computing processors). The various software shown may be run in series or parallel, or as a client-server configuration, or resident on different portions of the hardware shown. The central server 920 (or some variant of it) can act as a conduit for not only the client-side transaction but also for service-side transactions, such a credit processing and inventory management, connecting to other respective non-Eatelli servers (not shown) via net connection 930.

Figure 10A:
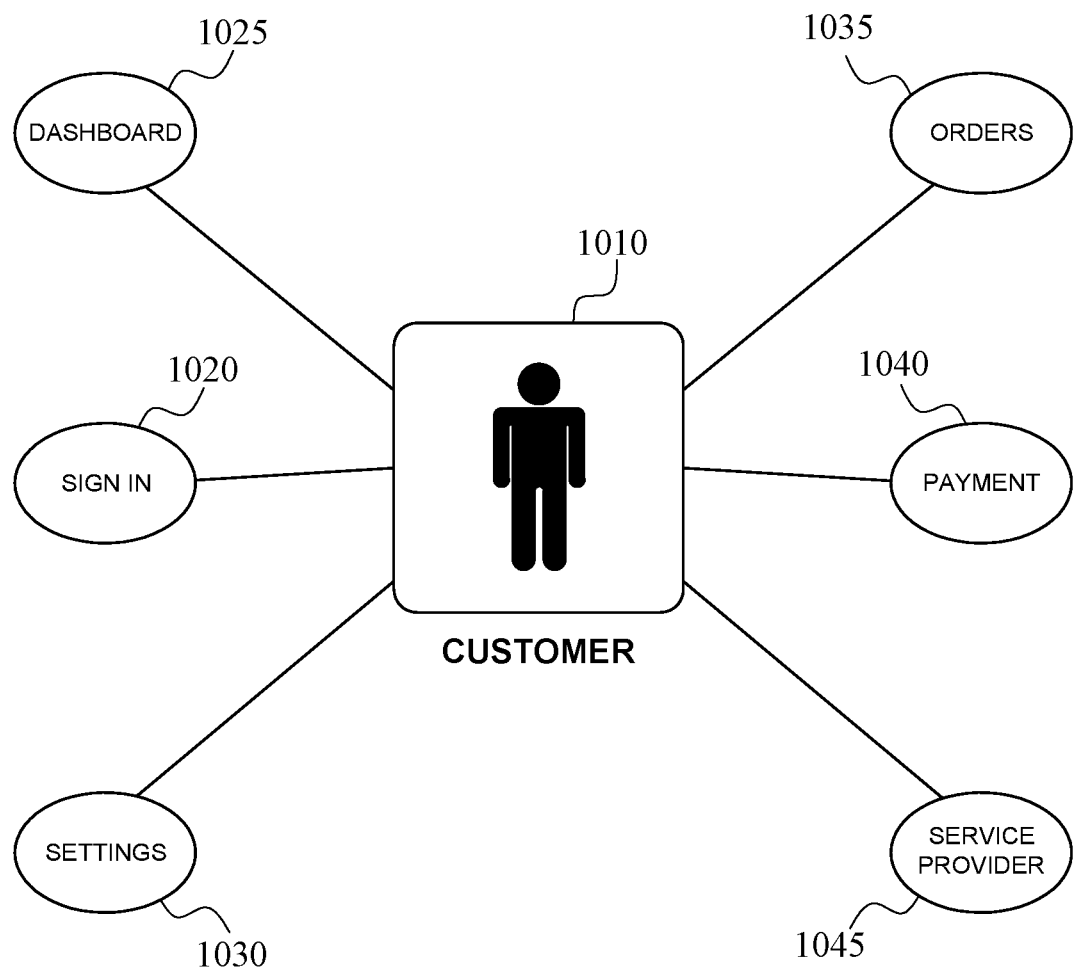
FIG. 10A is an illustration of a block diagram showing a top-level "function" topology from a customer-side (e.g., end-user).

FIG. 10A is an illustration of a block diagram showing a top-level "function" topology from a customer-side (e.g., end-user). Customer 1010 is presumed to have a smart phone or device (as shown in FIG. 9) with Eatelli application running therein. The smart phone application can have multiple functions, shown here, for example, configured with six distinct functions: Sign In 1020, Dashboard 1025, Settings 1030, Orders 1035, Payment 1040, and Service Provider 1045. The first three functions 1020, 1025, 1030 can be unique to the customer 1010 while the latter three functions 1035, 1040, 1045 are options that may be provided by the serving entity.

The Customer 1010 may, in some embodiments, be able to use the Eatelli application's Sign In 1020 function in an anonymous mode, wherein a unique identifier will be provided by the Eatelli application (or Eatelli server) and assigned to the user/end-device. This unique identifier ties the device to the anonymous account so the unique identifier cannot be used on other devices. Conversely, a conventional Sign In 1020 can be used, wherein customer identity, login/password, registration information, etc. (such as well known in the art for on-line or application account set up), can be implemented.

The Dashboard 1025 provides a "summary" of current activity by the customer 1010. For example, a list of all active orders, service provide details, order status, notification, coupons, sales, navigation, history, etc. can be presented. Settings 1030 can be preferences (default or customized) for the customer account. Other information commonly affiliated with settings can be available.

Service Provider 1045 can be a list of available goods or names of the providers, that the Customer 1010 is interested in, with subsequent options for selection of the respective goods. In the context of a restaurant, for example, a possible selection of "hamburgers" would bring up local restaurants (if geo-location is set to local) that serve hamburgers. The Customer 1010 can menu through one or more restaurants to review and begin the ordering process. The ordering process can be shared with Service Provider 1045 and with Orders 1035, if so desired.

Orders 1035 provides an overview for active orders and previous orders. Also, the ordering process can be started from Orders 1035, if so desired. Ordering can comprise multiple customer options, such as determining whether to make a scheduled order or immediate order, whether to eat at the service provider's location (i.e., restaurant) or request take out, determining which service provider to select, which location, choosing order items, adding additional services/goods to the appropriate options, showing a summary of the order(s), confirming purchase (or ordering), evaluating the order (from the Service Provider's side), paying for the (e.g., via a default account with Eatelli or the Service Provider 1045, in contrast to an independent credit or banking account), check-in, delivery orders, etc. As detailed earlier, geo-location in concert with the selection and/or ordering process can be utilized to shorten the time between ordering and receiving the ordered good(s).

In some embodiments, the exemplary system may provide a "shortest" time estimation amongst a plurality of Service Providers 1045. That is, if the customer 1010 is more concerned about timeliness than actual type of good, then a time-based option may be provided. Other embodiments may include Service Providers that are currently open, online status, delivery/pick-up options, and so forth.

Payment 1040 options can be managed via Settings 1030, on-the-spot (that is, for a selected transaction), through Eatelli software options (e.g., preferred payment or discount through Eatelli), or through the Service Provider's options.

Figure 10B:
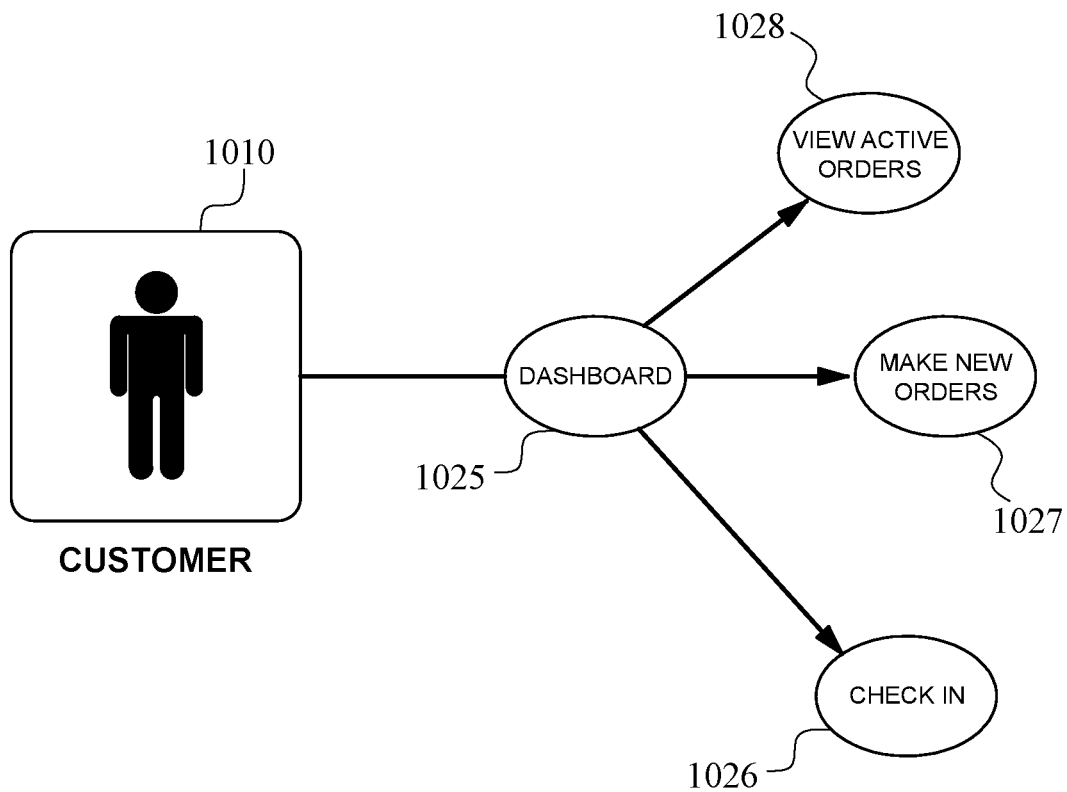
FIG. 10B is an illustration of some activities that can fall under the Dashboard 2015 function.

FIG. 10B is an illustration of some activities that can fall under the Dashboard 2015 function. In this non-limiting example, the Dashboard 1025 can provide check-in 1026 information as well as check-in updates (for example, the Dashboard 1025 may, after a extended period of time, for security purposes or other, require the Customer 1010 to check-in or re-sign-in). Or provide an easy and quick link to confirm Check-in at the Service Provider's location when the Customer 1010 arrives. Dashboard 1025 can also have a list or action table for making new orders 1028 and for reviewing active orders 1028. Options to modify the new/active orders can be provided in this stage, depending on implementation preference. For example, the Dashboard 1025 can provide options for additional food items that complement the ordered items (or featured items) and also filtered in a time-based hierarchy that fits within the Customer's time window (e.g., want to pick up in 30 minutes, and food items taking less than 30 minutes are offered as add-ons, or change items. Also, as the Customer 1010 nears the Service location, different food items that fit within the arrival time may be shown—e.g., fries that take only 5 minutes to prepare can be brought up when the Customer 1010 is within 5 minutes of the pickup location).

Figure 11:
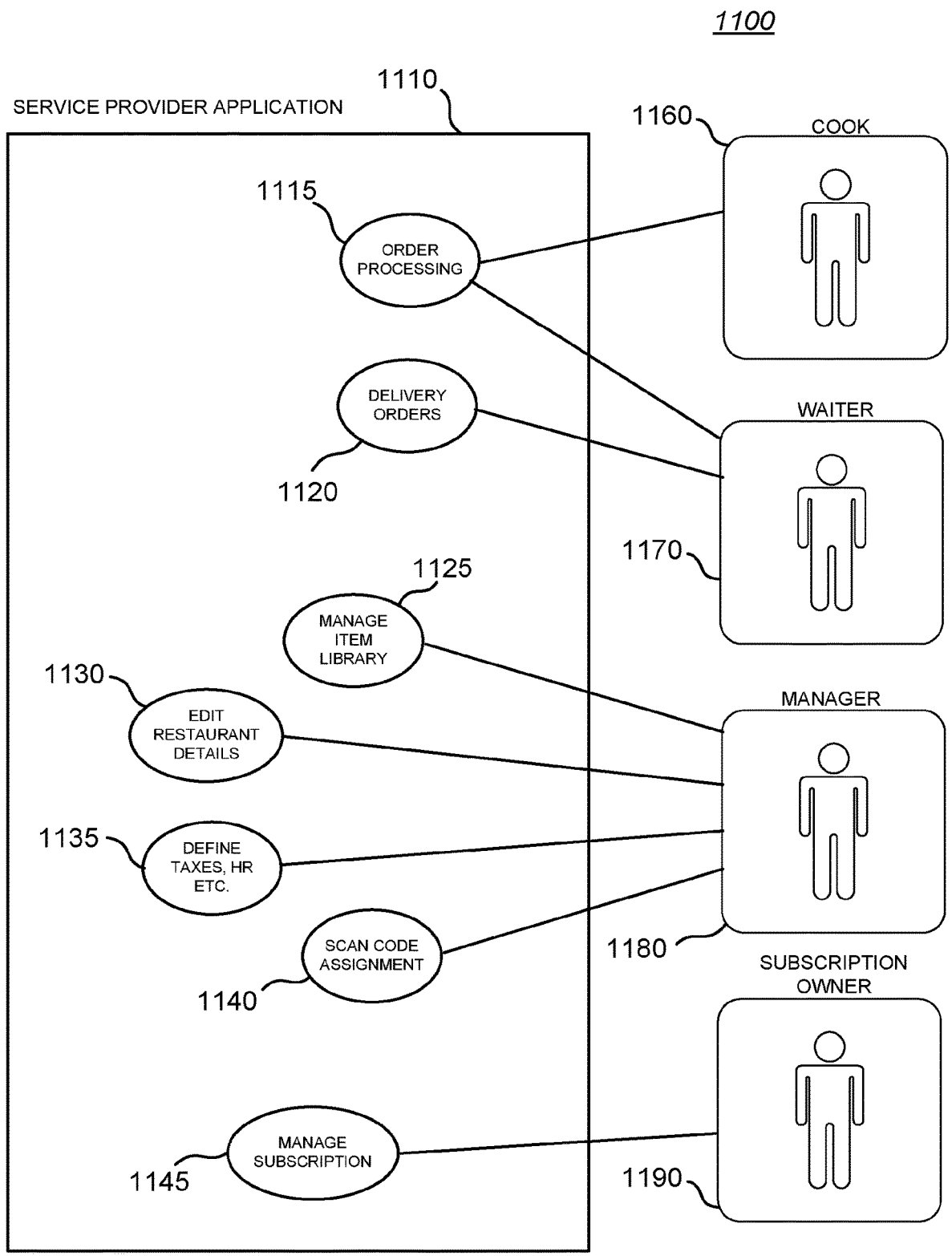
FIG. 11 is an illustration of some activities that fall under the Service Provider-side software application.

FIG. 11 is an illustration 1100 of some activities that fall under the Service Provider-side software application (as shown, for example in FIG. 9—932, 934, 936), in this example for a restaurant. The Service Provider Application 1110 provides compartmentalization of different functions. For example, Order Processing 1115 and Delivery Orders 1120 communication and handling is generally (but not necessarily) limited to between the Cook 1160 and the Waiter 1170. Manage Item Library 1125 (or menu, list of goods) is controlled by the Manager 1180 as well as the ability to Edit Restaurant Details 1130, Define Taxes, Human Resources, etc. 1135, and Scan Code Assignment. These elements may be also edited by an appropriate officer of the Service Provider. The Management of the Subscription 1145 can be limited to the Subscription Owner 1190.

As is evident, the Service Provider Application 1110 facilities the ability for specific personnel in the Service Provider to add and modify food categories, add and modify structure of menu, add, modify and query food information, add, modify and query employee information, manage orders produced from the application, manage taxes, tax rules, scheduling of personnel. Other personnel (e.g., Cook 1160) can manage and prepare time of order information.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, implementations, and realizations, which can, of course, vary. It is also to be understood that the terminology used herein is for the purpose of describing particular embodiments only, and is not intended to be limiting.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method for location and time-based scheduling of preparation and delivery of goods and/or services by a provider of the goods and/or services to a customer at the provider's site, comprising:

ordering, by a customer, a good or service via a customer-side software application resident on a customer's portable smart device, the customer-side software application communicating the order information and customer's current location information to a transaction server, wherein, when the customer is not at the provider's site, the customer's current location is geo-located and, when the customer is at the provider's site, the customer's current location is from scanning via the customer's portable smart device a location-specific code situated at a pre-determined location at the provider's site, wherein a plurality of the location-specific codes are distributed at seating areas at the provider's site, a precise location of each location-specific code being a priori known to the transaction server prior to being scanned by the customer;

receiving through a telecommunications link the customer's order and current customer location information on the transaction server;

forwarding through the telecommunications link the customer's order and customer account information to a provider-side software application on a computer of the provider of the good or service, wherein at least one of the provider-side software application and transaction server automatically determines an estimated time of arrival of the customer at the provider's site or, if the customer is at the provider's site, the customer's on-site location based on the location of the location-specific code scanned by the customer;

processing the customer's order, by the provider of the good or service, via at least the provider-side software application and transaction server;

determining a scheduling time for beginning preparation of the ordered good or service by the provider by comparing a preparation completion time and the estimated time of arrival of the customer at the provider's site or the customer's current location information at the provider's site; and acknowledging the customer's order, by the provider of the good or service, via at least the provider-side software application and transaction server by sending a confirmation to the customer-side software;

wherein the method reduces a wait time for a receipt of the ordered good or service at the provider's site.

2. The method of claim 1, wherein the location-specific code is at least one of a barcode, RFID, QR code, photograph, picture, and unique sound, the specific location at the site being at least one of an entrance, pickup location, table, bar position or seat, and room.

3. The method of claim 1, wherein the customer account information includes at least one of banking, credit card, and billing information.

4. The method of claim 1, wherein the estimated time of arrival of the customer at the provider's site is based on traffic information.

5. The method of claim 1, wherein provider-side software application communicates the customer's order and current customer location information to a personal provider device in possession by service personnel at the provider's site.

6. The method of claim 1, wherein the customer's current location information is updated periodically to provide a most current location information.

7. The method of claim 1, wherein the customer-side software application is loaded as a downloadable app.

8. The method of claim 1, wherein billing information is electronically processed by the either the provider-side software application or transaction server.

9. The method of claim 8, wherein an order receipt is printed out by the provider-side software to a printer at the provider's site.

10. The method of claim 1, wherein the customer order is a reservation.

11. The method of claim 1, wherein the order is an order for at least one of food and drink.

12. The method of claim 1, further comprising, sending from the customer-side software a request for "do not disturb" to the provider-side software application.

13. The method of claim 1, further comprising sending from the customer-side software an invite request to other customers' portable smart devices.

14. A machine-readable storage medium having stored thereon a computer program for location and time-based scheduling of preparation and delivery of goods and/or services to an on-site customer, comprising:

instructions for processing an order by a customer via a customer-side software application resident on a customer's portable smart device, the customer-side software application communicating the order information and customer's current location information to a transaction server, wherein, when the customer is not at the provider's site, the customer's current location is geo-located and, when the customer is at the provider's site, the customer's current location is from scanning via the customer's portable smart device a location-specific code situated at a pre-determined location at the provider's site, wherein a plurality of the location-specific codes are distributed at seating areas at the provider's site, a precise location of each location-specific code being a priori known to the transaction server prior to being scanned by the customer;

instructions for sending through a telecommunications link the customer's order and current customer location information to the transaction server;

instructions for forwarding through the telecommunications link the customer's order and customer account information to a provider-side software application on a computer of the provider of the good or service, wherein at least one of the provider-side software application and transaction server automatically determines an estimated time of arrival of the customer at the provider's site or, if the customer is at the provider's site, the customer's on-site location, based on the location of the location-specific code scanned by the customer;

instructions for processing the customer's order, by the provider of the good or service, via at least the provider-side software application and transaction server;

instructions for determining a scheduling time for beginning preparation of the ordered good or service by the provider by comparing a preparation completion time and the estimated time of arrival of the customer at the provider's site or the customer's current location information at the provider's site; and instructions for acknowledging the customer's order, by the provider of the good or service, via at least the provider-side software application and transaction server by sending a confirmation to the customer-side software;

wherein the method reduces a wait time for a receipt of the ordered good or service at the provider's site.

15. A system for providing location and time-based scheduling of preparation and delivery of goods and/or services, comprising:

a customer-side software application resident on a customer's portable smart device, configured to receive a customer's order of a good or service, and communicate the order information and customer's current location information to a transaction server, wherein, when the customer is not at the provider's site, the customer's current location is geo-located and, when the customer is at the provider's site, the customer's current location is from scanning via the customer's portable smart device a location-specific code situated at a pre-determined location at the provider's site, wherein a plurality of the location-specific codes are distributed at seating areas at the provider's site, a precise location of each location-specific code being a priori known to the transaction server prior to being scanned by the customer;

a telecommunications link between the customer's portable smart device and the transaction sever, the link forwarding the customer's order, current customer location information to the transaction server, and customer account information to a provider-side software application on a computer of the provider of the good or service, wherein at least one of the provider-side software application and transaction server automatically determines an estimated time of arrival of the customer at the provider's site or, if the customer is at the provider's site, the customer's on-site location based on the location of the location-specific code scanned by the customer and wherein at least one of the provider-side software application and transaction server processes the customer's order, and wherein the provider-side software application schedules a time for beginning preparation for the ordered good or service by the provider by comparing a preparation completion time and the estimated time of arrival of the customer at the provider's site or the customer's current location information at the provider's site, and wherein at least one of the provider-side software application and transaction server acknowledges the customer's order by sending a confirmation to the customer-side software;

wherein the system reduces a wait time for a receipt of the ordered good or service at the provider's site.

16. The system of claim 15, wherein the location-specific code is at least one of a barcode, RFID, QR code, photograph, picture, and unique sound, the specific location at the site being at least one of an entrance, pickup location, table, bar position or seat, and room.

17. The system of claim 15, wherein, the customer account information includes at least one of banking, credit card, and billing information.

18. The system of claim 15, wherein the provider-side software application exchanges of the customer order between at least one of a server, cook, and manager at the provider of the good or service and the customer-side software application is updated with a status of the customer order from at least one of the server, cook, and manager.

* * * * *